United States Patent
Digmann et al.

(10) Patent No.: US 9,751,703 B2
(45) Date of Patent: Sep. 5, 2017

(54) FACE PANELS FOR LOADING DOCK SEALS AND SHELTERS

(71) Applicants: Charles Digmann, Dubuque, IA (US); Timothy J. Schmidt, Dubuque, IA (US); Frank Heim, Platteville, WI (US)

(72) Inventors: Charles Digmann, Dubuque, IA (US); Timothy J. Schmidt, Dubuque, IA (US); Frank Heim, Platteville, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 15/008,708

(22) Filed: Jan. 28, 2016

(65) Prior Publication Data

US 2016/0137436 A1    May 19, 2016

Related U.S. Application Data

(63) Continuation of application No. 14/531,765, filed on Nov. 3, 2014, now Pat. No. 9,273,512, which is a
(Continued)

(51) Int. Cl.
*E04D 13/18* (2014.01)
*E04H 14/00* (2006.01)
(Continued)

(52) U.S. Cl.
CPC .......... *B65G 69/008* (2013.01); *E06B 7/2303* (2013.01)

(58) Field of Classification Search
CPC ... E06B 7/2303; E06B 7/2301; B65G 69/008; B65G 69/001; B60J 10/0042; B60J 10/085
See application file for complete search history.

(56) References Cited

U.S. PATENT DOCUMENTS

| | | | |
|---|---|---|---|
| 3,322,132 A | 5/1967 | Rieder et al. | |
| 3,403,489 A | 10/1968 | Frommelt et al. | |

(Continued)

FOREIGN PATENT DOCUMENTS

| | | |
|---|---|---|
| CA | 2630439 A1 | 11/2008 |
| CN | 201665181 U | 12/2010 |

(Continued)

OTHER PUBLICATIONS

European Patent Office. "Communication Pursuant to Rules 161(1) and 162 EPC," issued in connection with European Patent Application No. 13707983.6-1708, dated Oct. 1, 2014. (2 pages).

(Continued)

*Primary Examiner* — Brian Mattei
(74) *Attorney, Agent, or Firm* — Hanley, Flight & Zimmerman, LLC

(57) ABSTRACT

Seal assemblies for dock shelters and dock seals at a loading dock are disclosed herein. An example seal assembly includes a foam pad, a pliable cover to couple to the foam pad, and a shield to attach to the foam pad. The shield has a first end and a second end. The first end is to couple to at least one of the foam pad or the pliable cover and the second end is to project adjacent a vehicle-engaging surface of the foam pad. The shield is to move relative to the foam pad between a standby position when a vehicle is in a non-engaging relationship with the vehicle-engaging surface and a deflected position when the vehicle is in engagement with the vehicle-engaging surface.

18 Claims, 22 Drawing Sheets

Related U.S. Application Data continuation-in-part of application No. 13/404,962, filed on Feb. 24, 2012, now Pat. No. 8,915,029.

(51) Int. Cl.
*B65G 69/00* (2006.01)
*E06B 7/23* (2006.01)

(56) References Cited

U.S. PATENT DOCUMENTS

| | | | |
|---|---|---|---|
| 3,653,173 A | 4/1972 | Frommelt et al. | |
| 3,939,614 A | 2/1976 | Frommelt et al. | |
| 4,213,279 A * | 7/1980 | Layne | B65G 69/008 52/173.2 |
| 4,638,612 A * | 1/1987 | Bennett | B65G 69/008 14/71.5 |
| 4,679,364 A * | 7/1987 | Fettig | B65G 69/008 14/71.5 |
| 4,711,059 A | 12/1987 | Layne | |
| 4,799,342 A * | 1/1989 | Klevnjans | E04F 10/04 52/173.2 |
| 4,805,362 A | 2/1989 | Frommelt et al. | |
| 5,185,977 A | 2/1993 | Brockman et al. | |
| 5,341,613 A * | 8/1994 | Brockman | B65G 69/008 52/173.2 |
| 5,394,662 A | 3/1995 | Giuliani et al. | |
| 5,553,424 A * | 9/1996 | Brockman | B65G 69/008 49/504 |
| 5,622,016 A | 4/1997 | Frommelt et al. | |
| 5,953,868 A | 9/1999 | Giuliani et al. | |
| 6,233,885 B1 | 5/2001 | Hoffmann et al. | |
| 6,948,285 B2 | 9/2005 | Miller et al. | |
| 8,112,948 B2 | 2/2012 | Desjardins | |
| 8,915,029 B2 | 12/2014 | Digmann et al. | |
| 9,187,271 B2 | 11/2015 | Digmann et al. | |
| 9,273,512 B2 | 3/2016 | Digmann et al. | |
| 2002/0110423 A1 | 8/2002 | Miller et al. | |
| 2004/0020141 A1 | 2/2004 | Borgerding | |
| 2004/0134139 A1 | 7/2004 | Busch et al. | |
| 2004/0163326 A1 | 8/2004 | Miller et al. | |
| 2004/0261335 A1 | 12/2004 | Eungard | |
| 2005/0102929 A1* | 5/2005 | Hoffmann | B65G 69/008 52/173.2 |
| 2005/0166488 A1 | 8/2005 | Borgerding | |
| 2006/0026912 A1 | 2/2006 | Eungard et al. | |
| 2006/0032159 A1 | 2/2006 | Eungard et al. | |
| 2006/0090407 A1 | 5/2006 | Hoffmann et al. | |
| 2007/0283636 A1 | 12/2007 | Bernacki et al. | |
| 2008/0302029 A1 | 12/2008 | Desjardins | |
| 2009/0178349 A1* | 7/2009 | Schmidt | B65G 69/008 52/173.2 |
| 2010/0251639 A1 | 10/2010 | Hoffmann et al. | |
| 2010/0269427 A1* | 10/2010 | Digmann | B65G 69/008 52/173.2 |
| 2013/0221624 A1 | 8/2013 | Digmann et al. | |
| 2015/0052833 A1 | 2/2015 | Digmann et al. | |

FOREIGN PATENT DOCUMENTS

| | | |
|---|---|---|
| EP | 1457443 | 9/2004 |
| WO | 8102604 | 9/1981 |

OTHER PUBLICATIONS

International Bureau, "International Preliminary Report on Patentability," issued in connection with International Application No. PCT/US2013/026664, dated Aug. 26, 2014, 5 pages.

International Searching Authority, "Search Report" issued in connection with International Patent Application No. PCT/US2013/026664, dated Jun. 12, 2013, 6 pages.

International Searching Authority, "Written Opinion" issued in connection with International Patent Application No. PCT/US2013/026664, dated Jun. 12, 2013, 4 pages.

U.S., "Final Office Action," issued in connection with U.S. Appl. No. 13/404,962, dated Dec. 17, 2013, 7 pages.

U.S., "Non-Final Office Action," issued in connection with U.S. Appl. No. 13/404,962, dated Aug. 28, 2013, 9 pages.

U.S., "Non-Final Office Action," issued in connection with U.S. Appl. No. 13/404,962, dated Apr. 16, 2014, 14 pages.

U.S., "Notice of Allowance," issued in connection with U.S. Appl. No. 13/404,962, dated Mar. 6, 2014, 9 pages.

U.S., "Notice of Allowance," issued in connection with U.S. Appl. No. 13/404,962, dated Aug. 13, 2014, 13 pages.

U.S., "Supplemental Notice of Allowability," issued in connection with U.S. Appl. No. 13/404,962, dated Oct. 14, 2014, 2 pages.

U.S., "Supplemental Notice of Allowability," issued in connection with U.S. Appl. No. 13/404,962, dated Nov. 24, 2014, 2 pages.

U.S., "Requirement for Restriction/Election," issued in connection with U.S. Appl. No. 13/404,962, dated Jul. 10, 2013, 7 pages.

State Intellectual Property Office, "Office Action," issued in connection with Application No. 201380010329.X, dated Jun. 2, 2015, 8 pages.

European Patent Office. "Communication Pursuant to Article 94(3) EPC," issued in connection with European Patent Application No. 13707983.6-1708, Jun. 26, 2015, 5 pages.

U.S., "Final Office Action," issued in connection with U.S. Appl. No. 14/531,765, dated Jul. 21, 2015, 20 pages.

U.S., "Non-Final Office Action", issued in connection with U.S. Appl. No. 14/531,765, dated Apr. 15, 2015 (27 pages.)

U.S., "Non-Final Office Action," issued in connection with U.S. Appl. No. 14/531,760, dated Apr. 15, 2015, 9 pages.

U.S., "Notice of Allowance," issued in connection with U.S. Appl. No. 14/531,760, dated Jul. 6, 2015, 8 pages.

U.S., "Supplemental Notice of Allowability," issued in connection with U.S. Appl. No. 14/531,760, dated Jul. 23, 2015, 2 pages.

U.S., "Supplemental Notice of Allowability," issued in connection with U.S. Appl. No. 14/531,760, dated Aug. 6, 2015, 2 pages.

U.S., "Supplemental Notice of Allowability," issued in connection with U.S. Appl. No. 14/531,760, dated Aug. 18, 2015, 2 pages.

U.S., "Requirement for Restriction/Election," issued in connection with U.S. Appl. No. 14/531,765, dated Feb. 4, 2015, 9 pages.

U.S., "Notice of Allowance," issued in connection with U.S. Appl. No. 14/531,765, dated Oct. 15, 2015, 35 pages.

Canadian Intellectual Property Office, "Office Action," issued in connection with Application No. 2,860,988, dated Oct. 20, 2015, 3 pages.

European Patent Office, "Extended European Search Report," issued in connection with Application No. 15001318.3, dated Nov. 12, 2015, 9 pages.

State Intellectual Property Office, "Office Action," issued in connection with Application No. 201380010329.X, dated Dec. 23, 2015, 6 pages.

U.S., "Supplemental Notice of Allowability," issued in connection with U.S. Appl. No. 14/531,760, dated Jan. 13, 2016, 6 pages.

Canadian Patent Office "Office action", issued in connection with Canadian Patent application No. 2,860, 988, dated Aug. 10, 2016, 3 pages.

Chinese Patent Office, "Third Office action", issued in connection with Chinese patent application No. 201380010328.x, dated May 31, 2016, 6 pages, with non-certified English translation.

European Patent Office, "Decision to grant", issued in connection with European patent office No. 13707983.6, dated Jun. 30, 2016, 2 pages.

European Patent Office, "Communication pursuant to Article 94(3) EPC," issued in connection with European Patent Application No. 15001318.3, dated Dec. 12, 2016, 5 pages.

* cited by examiner

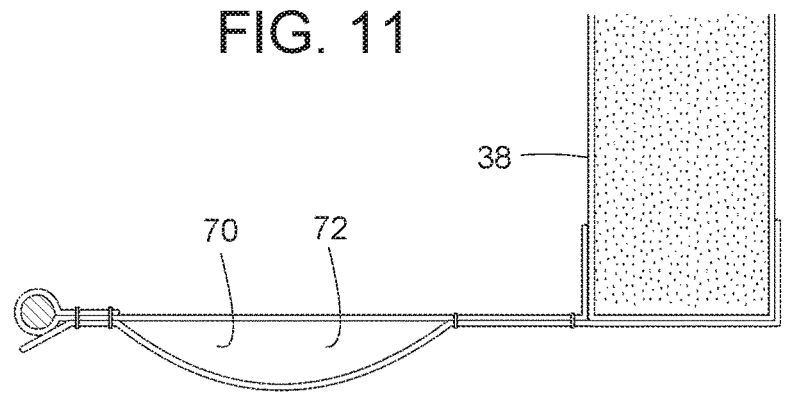
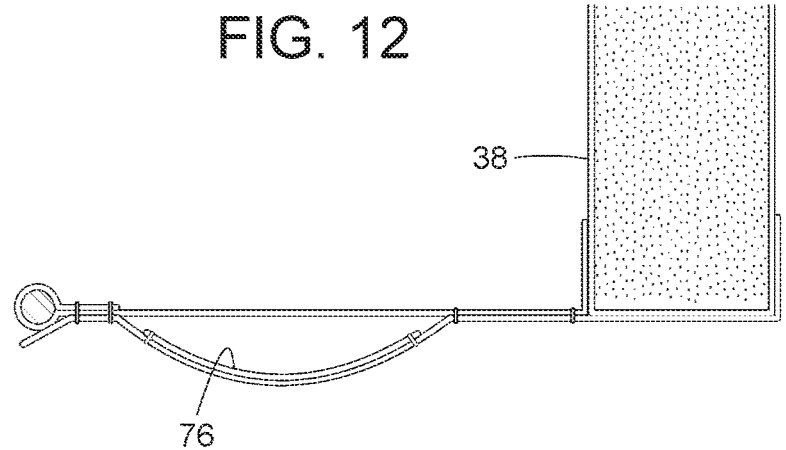
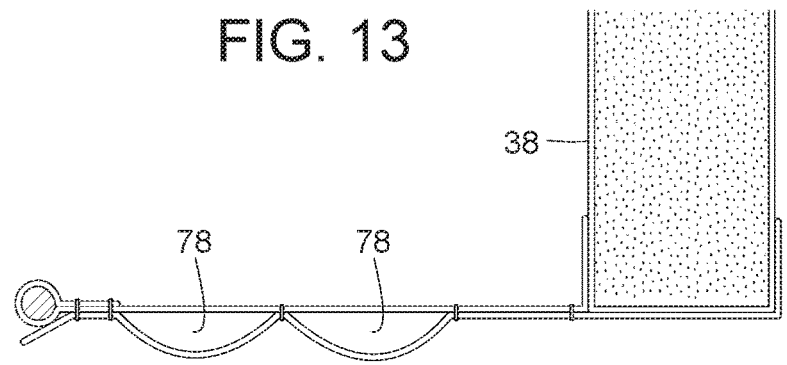

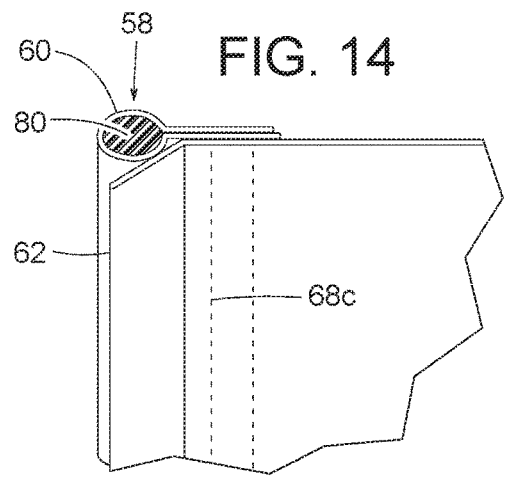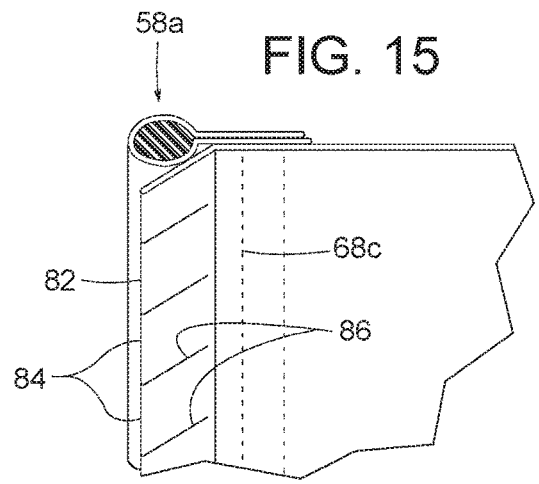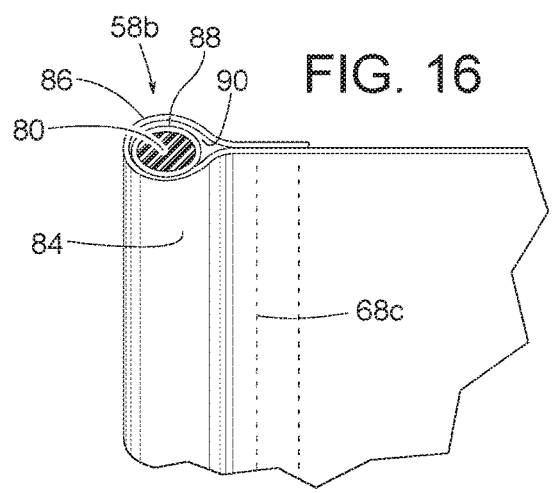

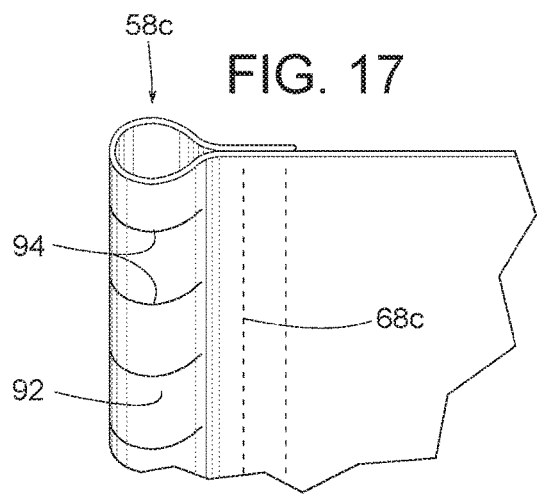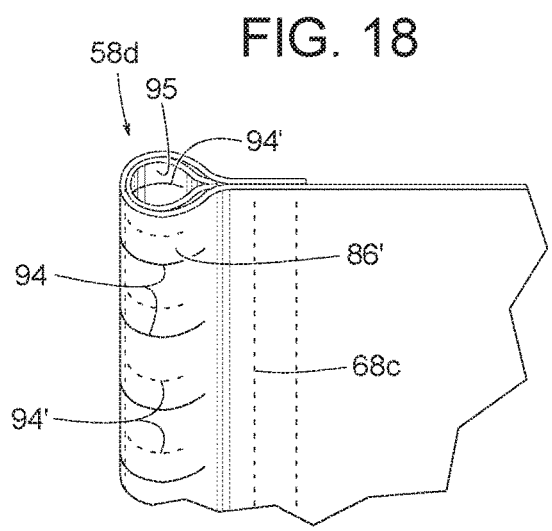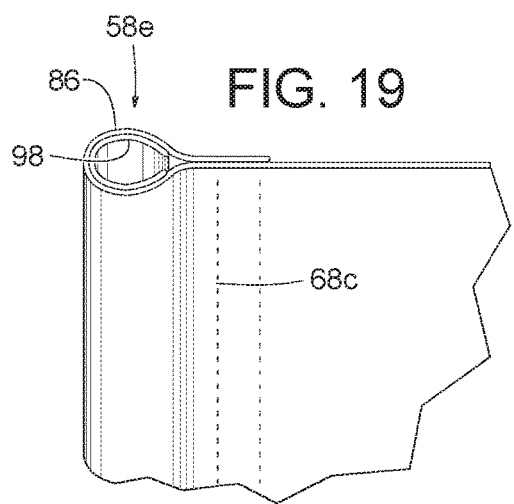

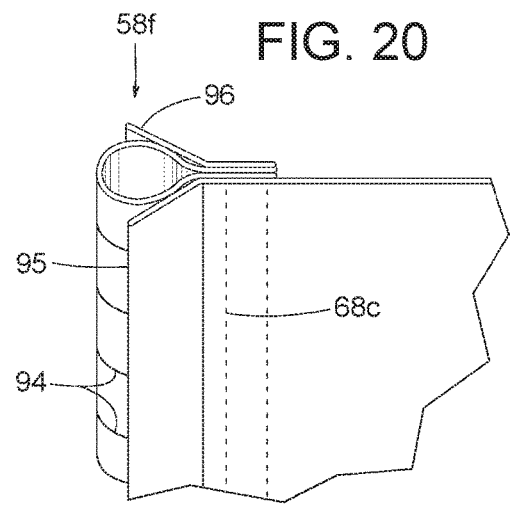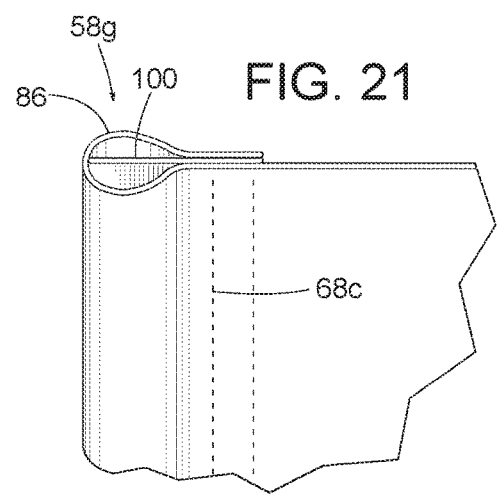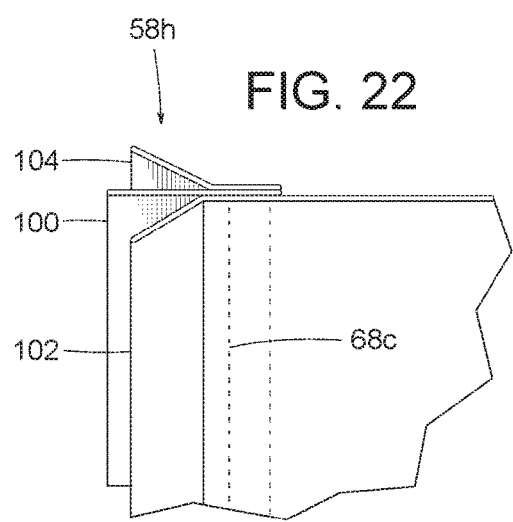

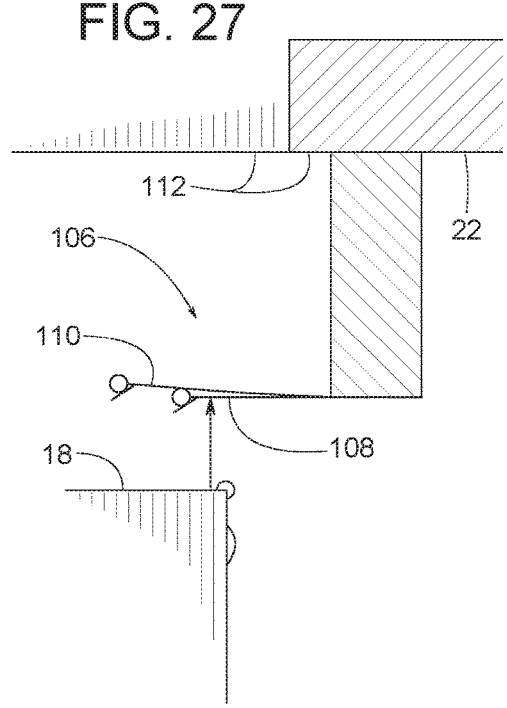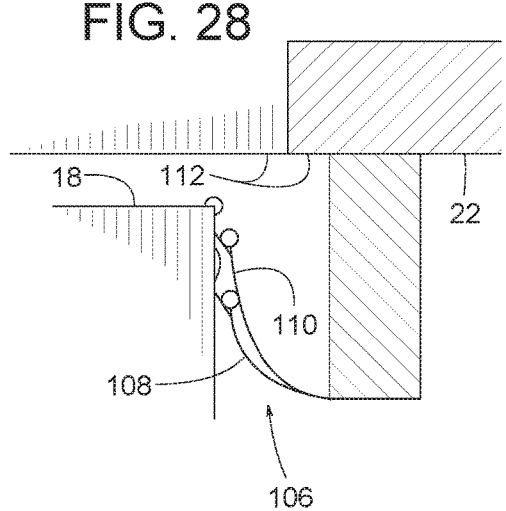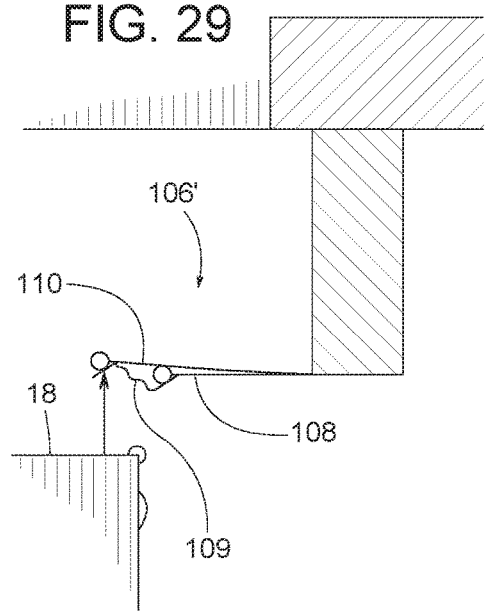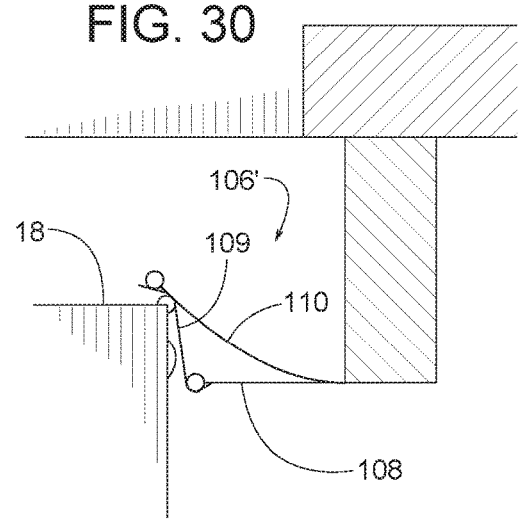

FIG. 31
FIG. 32
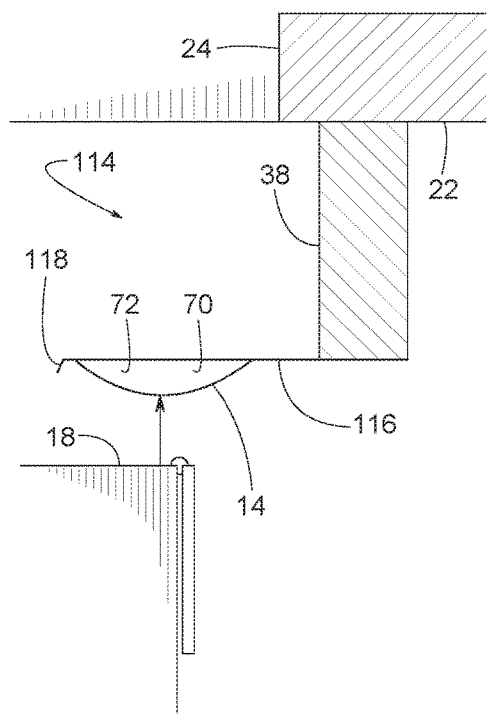
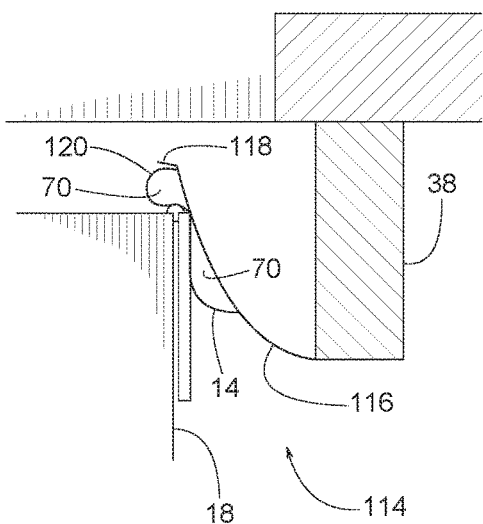

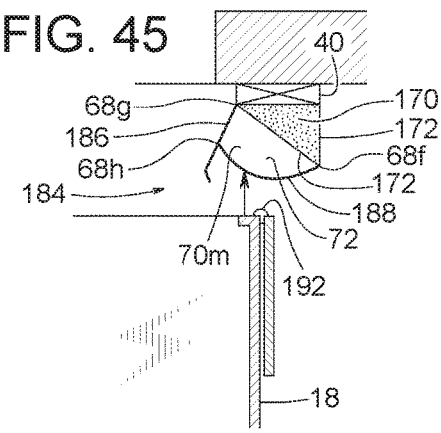
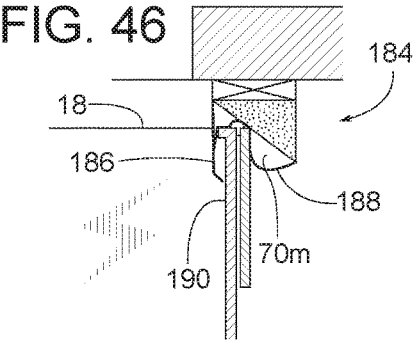
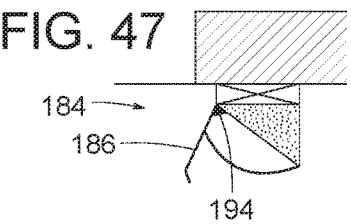
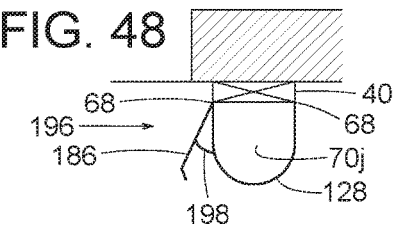
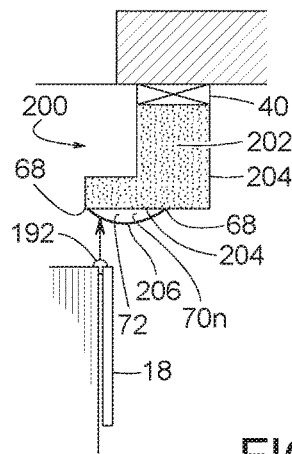
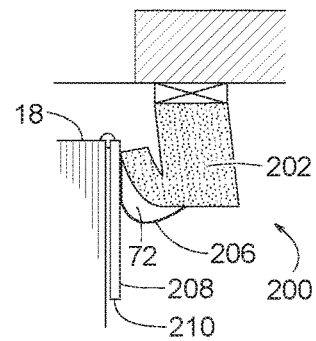
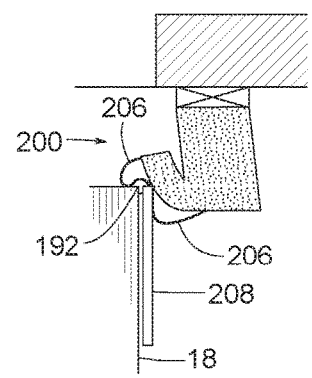
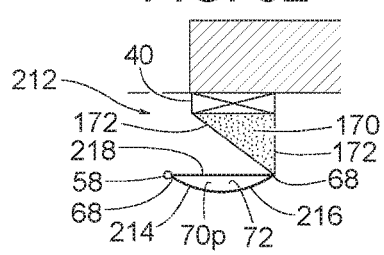
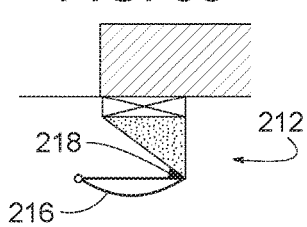

FACE PANELS FOR LOADING DOCK SEALS AND SHELTERS

CROSS REFERENCE TO RELATED APPLICATIONS

This patent arises from a continuation of U.S. patent application Ser. No. 14/531,765, filed on Nov. 3, 2014, entitled "Face Panels For Loading Dock Seals and Shelters," (now U.S. Pat. No. 9,273,512), which is a continuation-in-part of U.S. patent application Ser. No. 13/404,962, filed on Feb. 24, 2012, entitled "Face Panels For Loading Dock Seals and Shelters," (now U.S. Pat. No. 8,915,029), which are both incorporated herein by reference in their entireties.

FIELD OF THE DISCLOSURE

This patent generally pertains to loading dock seals and dock shelters for vehicles and, more specifically, to face panels for loading dock seals and shelters.

BACKGROUND

In general, dock seals and shelters prevent the ingress of outdoor environmental conditions or contaminants (e.g., rain, snow, wind, hot/cold temperatures, insects, animals, etc.) into the interior of a building (e.g., the dock area) and/or cargo area of a vehicle during the loading or unloading of the vehicle. Dock shelters and seals may also prevent the egress of conditioned air from within a building and/or a vehicle cargo area to the outdoor environment. In some instances, vehicles (e.g., the trailer or rear portion of a truck) may not be sufficiently centered relative to dock seals or shelters when backed into the seal or shelter to isolate the interior space of a building and adjacent vehicle cargo area from the outdoor environment. As a result, some dock seals and shelters compensate for some range of off-center vehicle positions within which the functionality of the seal or shelter is not compromised. Further, some structures of a seal or shelter, particularly side members, are capable of recovering from repeated impacts from the rear portions of off-center vehicles without sustaining substantial permanent deformation.

BRIEF DESCRIPTION OF THE DRAWINGS

FIG. 11 is a cross-sectional view similar to FIG. 2, but showing another example seal assembly disclosed herein.

FIG. 12 is a cross-sectional view similar to FIG. 9, but showing another example seal assembly disclosed herein.

FIG. 13 is a cross-sectional view similar to FIG. 10, but showing yet another example seal assembly disclosed herein.

FIG. 14 is a perspective view showing a first example tip seal of the example seal assembly of FIGS. 2-7.

FIG. 15 is a perspective view similar to FIG. 14, but showing a second example tip seal for use with example seal assemblies disclosed herein.

FIG. 16 is a perspective view similar to FIG. 14, but showing a third example tip seal for use with example seal assemblies disclosed herein.

FIG. 17 is a perspective view similar to FIG. 14 but showing a fourth example tip seal for use with example seal assemblies disclosed herein.

FIG. 18 is a perspective view similar to FIG. 14, but showing a fifth example tip seal for use with example seal assemblies disclosed herein.

FIG. 19 is a perspective view similar to FIG. 14 but showing a sixth example tip seal for use with example seal assemblies disclosed herein.

FIG. 20 is a perspective view similar to FIG. 14 but showing a seventh example tip seal for use with example seal assemblies disclosed herein.

FIG. 21 is a perspective view similar to FIG. 14 but showing an eighth example tip seal for use with example seal assemblies disclosed herein.

FIG. 22 is a perspective view similar to FIG. 14 but showing a ninth example tip seal for use with example seal assemblies disclosed herein.

FIG. 27 is a cross-sectional view similar to FIG. 24, but showing another vehicle approaching the seal assembly of FIG. 24.

FIG. 28 is a cross-sectional view similar to FIG. 26, but showing the example seal assembly of FIG. 24 in a third deflected position.

FIG. 29 is a cross-sectional view similar to FIG. 23, but showing another example seal assembly disclosed herein.

FIG. 30 is a cross-sectional view similar to FIG. 25, but showing the example seal assembly of FIG. 29 in a deflected position.

FIG. 31 is a cross-sectional view similar to FIG. 3, but showing another example seal assembly disclosed herein.

FIG. 32 is a cross-sectional view similar to FIG. 31, but showing the example seal assembly of FIG. 31 sealed against a vehicle.

FIG. 45 is a cross-sectional top view similar to FIG. 33, but showing another example seal assembly disclosed herein.

FIG. 46 is a cross-sectional top view similar to FIG. 45, but showing a vehicle engaging the example seal assembly of FIG. 45.

FIG. 47 is a cross-sectional top view similar to FIG. 45, but showing the example seal assembly of FIG. 45 having a stiffener.

FIG. 48 is a cross-sectional top view similar to FIG. 33, but showing another example seal assembly disclosed herein.

FIG. 49 is a cross-sectional top view similar to FIG. 33, but showing another example seal assembly disclosed herein with a vehicle approaching it.

FIG. 50 is a cross-sectional top view similar to FIG. 49, but showing the example seal assembly of FIG. 48 deflected by a vehicle.

FIG. 51 is a cross-sectional top view similar to FIG. 49, but showing the example seal assembly of FIG. 49 in another deflected position.

FIG. 52 is a cross-sectional top view similar to FIG. 33, but showing another example seal assembly disclosed herein.

FIG. 53 is a cross-sectional top view similar to FIG. 52, but showing the example seal assembly of FIG. 52 having an added stiffener.

Figure 1:
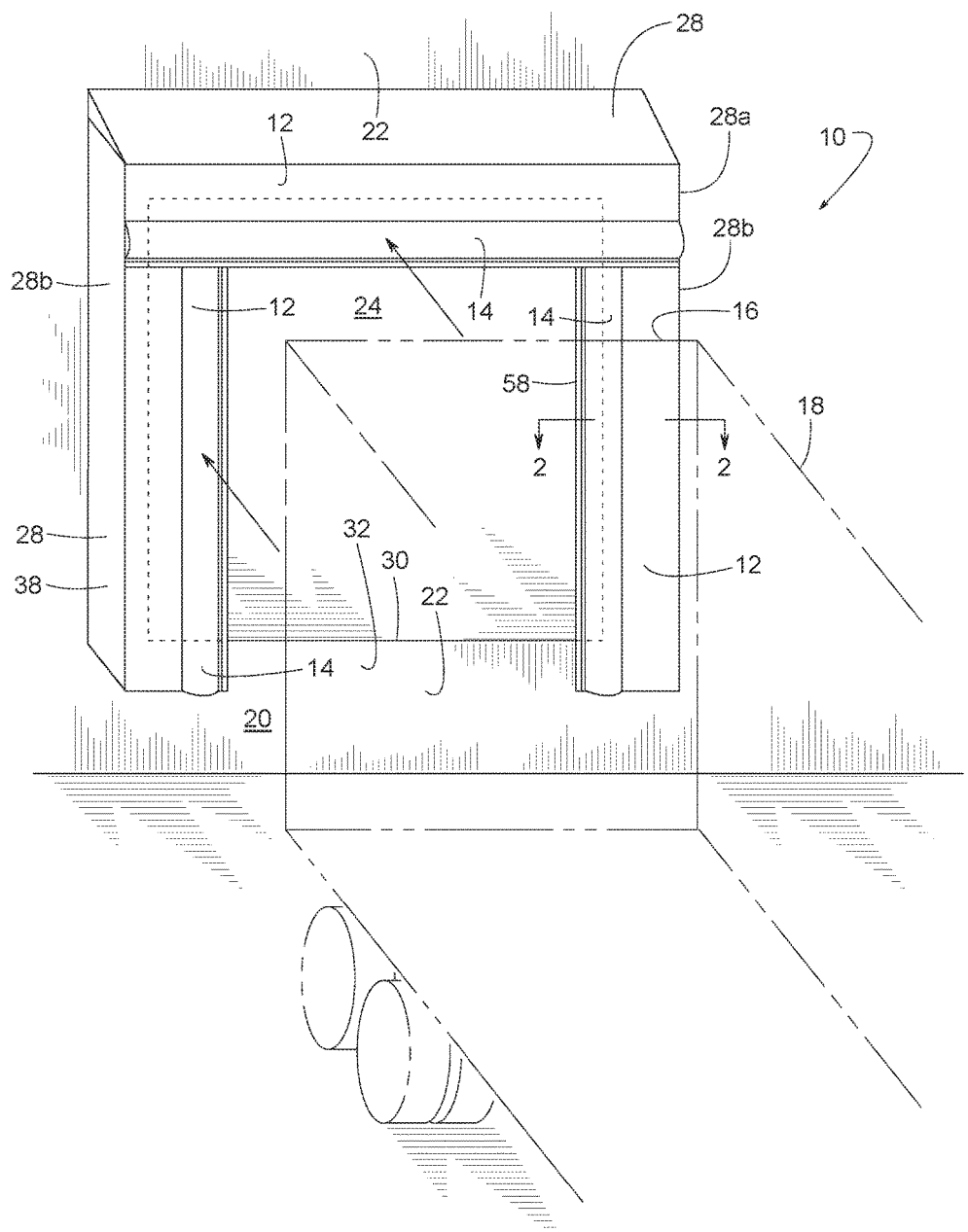
FIG. 1 is a perspective view of an example dock shelter incorporating an example seal assembly in accordance with the teachings of this disclosure.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Some known dock seals use side members having a compressible foam core or body surrounded by a coated fabric or vinyl outer layer. The foam core provides sufficient structural rigidity to enable the side members to be extended a short distance from the building wall surrounding the loading dock. The coated fabric outer layer protects the foam core from outdoor environmental conditions (e.g., moisture), provides wear resistance to repeated impacts from the rear portions of vehicles, and may provide desirable aesthetic qualities. Additionally, a header structure may span between the side members along a top portion of the loading dock opening. The header structure may be another compressible member similar in construction to the side members and, in some cases, may include a weighted fabric curtain that hangs downwardly to contact the top of a truck trailer to form an environmental barrier along the top of the trailer.

Another type of dock seal uses inflatable side members and a header structure having internal compressible resilient pads, which provide some degree of side member compressibility when the side members are in a deflated condition. In either case, when the rear portion of a vehicle (e.g., a truck trailer) is backed into either foam or inflatable dock seal side and header members, the side and header members are compressed toward the building wall to form a seal along the lateral and top back edges of the vehicle. If present, the head curtain sweeps along the top of the trailer to form a seal at the top of the trailer between the side members. Dock seals typically consume a relatively small amount of wall space and can provide a relatively high quality seal between the rear edges of a vehicle and the outside building wall surrounding the dock. However, when the dock seal side members are compressed, they may be displaced into or otherwise encroach on the opening to the rear of the docked vehicle. As a result, the compressed side member may interfere with operation of a fork lift and/or an operator during loading and unloading activities. In addition, inflatable dock seals are susceptible to power losses and tears that compromise the ability of the side members to inflate to provide an acceptable seal.

In contrast to dock seals, some known dock shelters use side members that are mounted to the outside building wall surrounding the loading dock. The side members are spaced well to the outside of the sides of a docked vehicle. The side members are configured to extend (i.e., to be cantilevered) an appreciable distance from the outside building wall, particularly in cases where a dock leveler protrudes from the dock opening. The side members may also support flexible seal members, which are often referred to as side curtains, extending inwardly from the side members across at least a portion of the opening defined by the side members. When a vehicle such as, for example, a truck trailer, is backed into the opening of the dock shelter, the inwardly facing edges of the seal members or side curtains resiliently deflect and sweep against the lateral sides of the trailer to form an environmental barrier therebetween. As with dock seals, dock shelters also typically include a header structure, which may include a head curtain, to form an environmental barrier along the top edge of the rear of the vehicle.

Dock shelters typically provide unobstructed access to a vehicle cargo area opening. However, known dock shelter side members may be constructed using rigid wood, fiberglass or metal frames capable of supporting the significant weight of the seal members or side curtains, which are usually held at an appreciable distance (e.g., several feet) from the building wall. Such side members may be permanently deformed if they are impacted by a vehicle. Accordingly, bumpers or stops may be mounted to the lower edge of the dock shelter to prevent a vehicle (e.g., a truck trailer) from impacting and damaging the rigid shelter.

The rigid side members used to implement these known dock shelters are also typically mechanically coupled via the header and/or another rigid member to provide increased lateral rigidity to the dock shelter to minimize the ability of the side members to move from side-to-side. Because of this, the side members typically have to be mounted relatively far apart to accommodate a wide range of possible off-center vehicle positions. This relatively large distance between the rigid side members consumes a significant and, thus, expensive amount of building wall space for each loading dock opening.

Some dock shelters have impactable side members. The impactable side members are similar to those used with dock seals and typically use a foam core or body surrounded by a coated fabric outer layer. Seal members or side curtains, which may be constructed using a fabric and flexible fiberglass stays combination or a foam core and fabric combination, are typically mounted to the side members to extend at least partially across the shelter opening. When a vehicle is backed into the shelter, the inwardly facing edges of the seal members or side curtains deflect and sweep against the sides of the vehicle to form an environmental barrier or seal against the sides of the vehicle. In the event the off-center position of a vehicle results in the rear of the vehicle impacting a side member, the foam core or body of the side member is resiliently compressed. When the vehicle is pulled away from an impacted side member, the foam core of the side member causes the side member to substantially recover to its original condition or shape.

Figure 59:
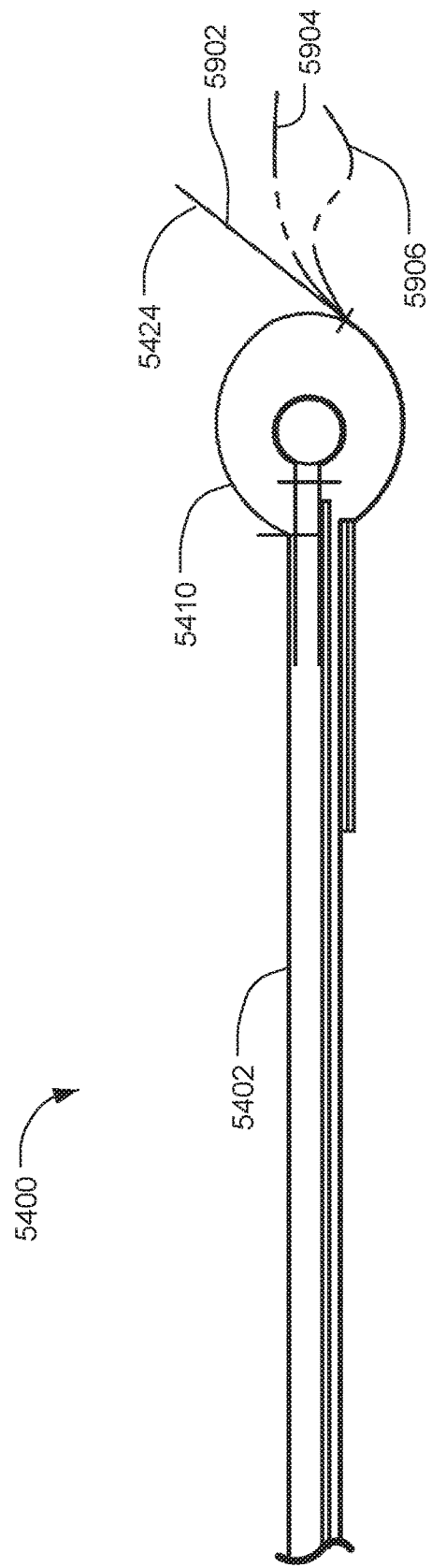
Figure 60:
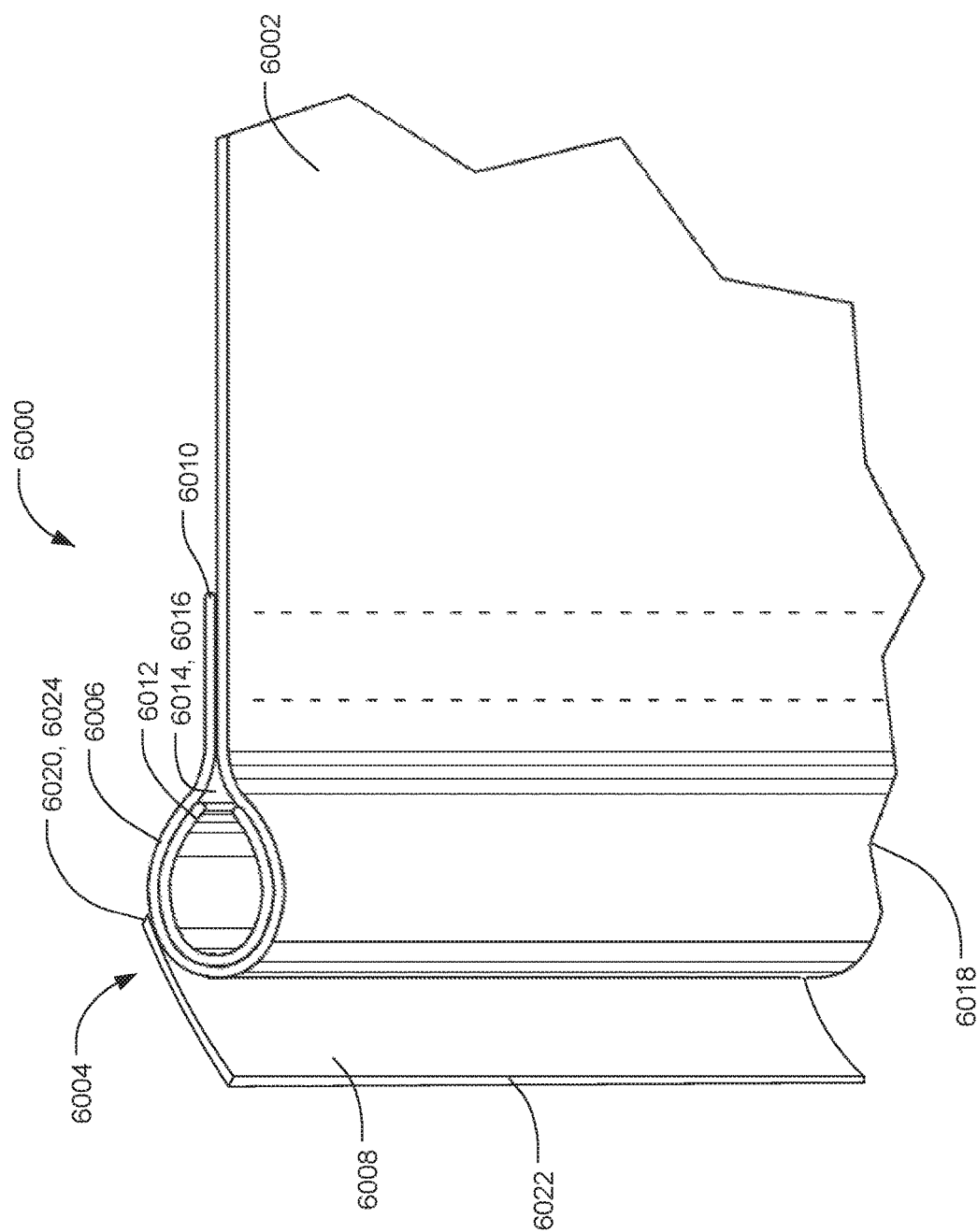
FIG. 60 illustrates another example seal assembly in accordance with teachings disclosed herein.

FIGS. 1-60 illustrate example loading dock seal assemblies (e.g., seal assembly 10, dock seals, dock shelters and/or combinations thereof) and various portions, features and variations thereof in accordance with the teachings of this disclosure. Some examples of seal assembly 10 include tip seals (e.g., shown in FIGS. 14-22, 54-60) and/or a face panel 12 with a fluid or air-filled blister 14 or "bubble" for sealingly conforming to a rear portion 16 of a vehicle 18 (e.g., a truck, a trailer, etc.) at a loading dock 20. Dock 20 may include, for example, a building wall 22 with a doorway 24 for transferring cargo to and from vehicle 18. To facilitate loading and/or unloading operations, some examples of dock 20 may include, for example, a dock leveler 26 (FIG. 2), bumpers, a vehicle restraint, etc.

Figure 2:
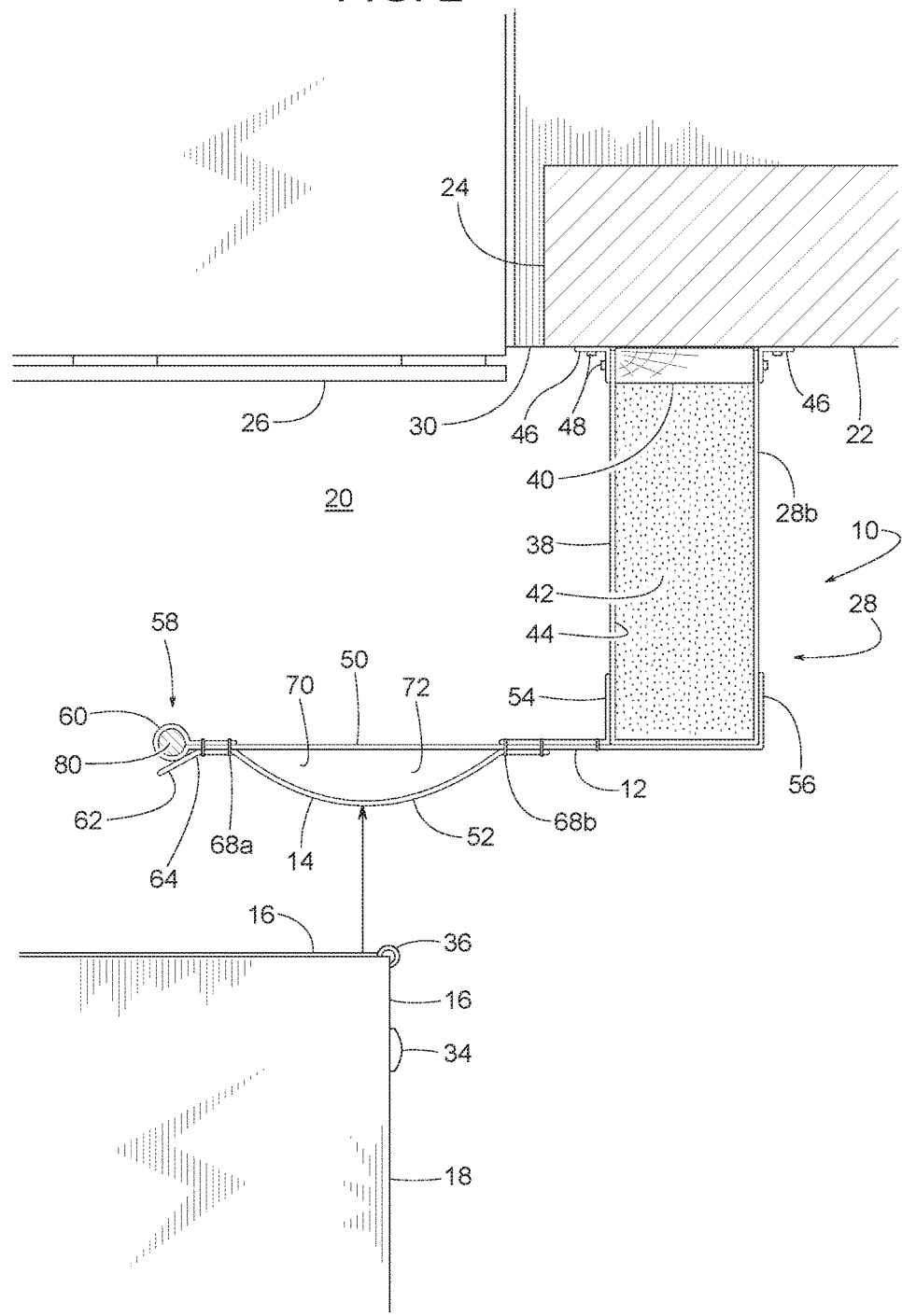
FIG. 2 is a cross-sectional view taken along line 2-2 of FIG. 1.
Figure 3:
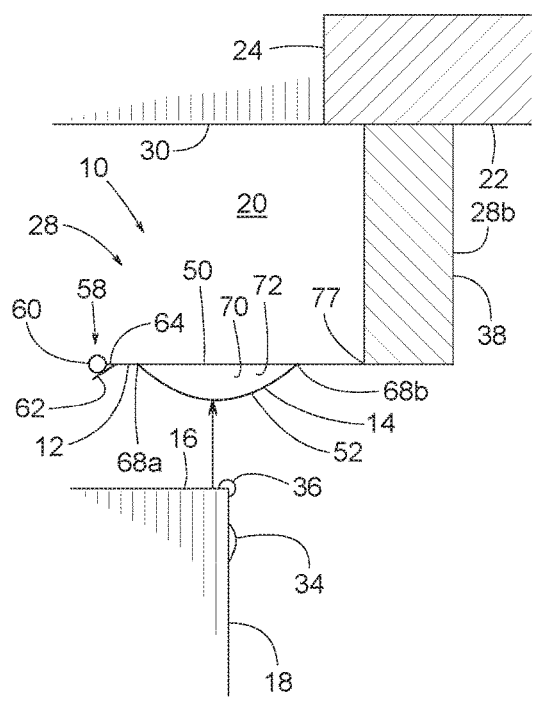
FIG. 3 is a cross-sectional view similar to FIG. 2 showing a vehicle approaching the example seal assembly with a face panel of the seal assembly in a standby position.
Figure 4:
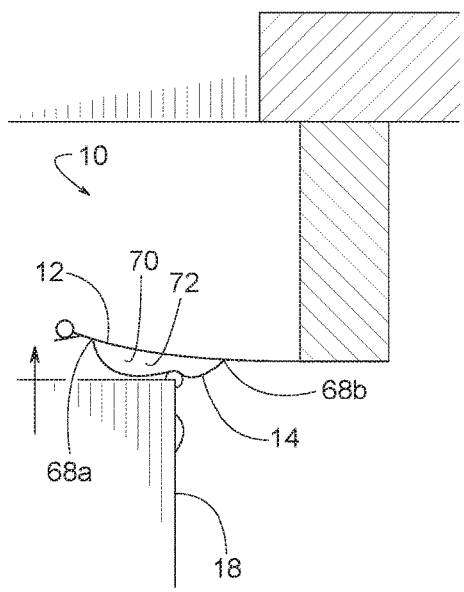
FIG. 4 is a cross-sectional view similar to FIG. 3, but showing the example face panel of FIG. 3 in a deflected position.
Figure 5:
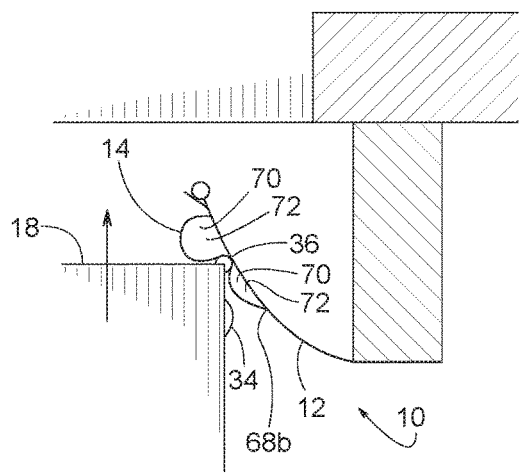
FIG. 5 is a cross-sectional view similar to FIG. 3, but showing the example face panel in another deflected position.
Figure 6:
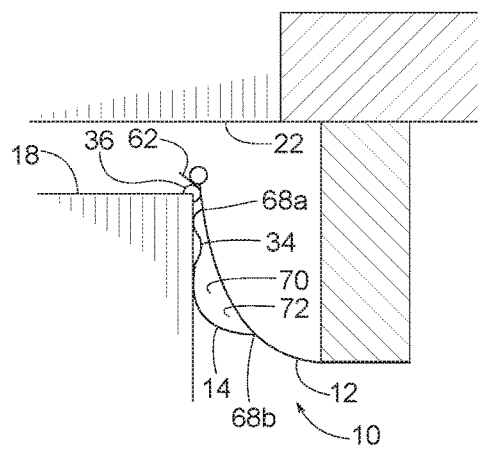
FIG. 6 is a cross-sectional view similar to FIG. 3, but showing the example face panel in yet another deflected position.

Seal assembly 10 of the illustrated example may be employed with a dock shelter 28 or dock seal to help seal out weather from the vehicle's rear portion 16 as vehicle 18 is being loaded or unloaded of its cargo. FIGS. 1-3 show vehicle 18 backing toward dock shelter 28, and FIGS. 4, 5 and 6 show the progression of vehicle 18 backing into shelter 28 (e.g., engaging shelter 28). Vehicle 18 stops, for example, when the vehicle's rear portion 16 is sufficiently close to the doorway's lower edge 30 to allow cargo to be readily transferred between a building 32 and vehicle 18. Sometimes a bumper mounted to wall 22 is used for establishing the vehicle's proper stopping position.

To help seal and/or shelter the upper and lateral edges of the vehicle's rear portion 16, dock shelter 28 of the illustrated example includes a header 28a and two side members 28b. In some examples, side members 28b and/or header 28a include seal assembly 10, which can sealingly conform to the vehicle's rear portion 16 and various irregularities of rear portion 16, such as, for example, a light 34 (e.g., a tail light, a side running light, a reflector, etc.), a piece of door hardware 36 (e.g., a hinge, a hinged edge of a rear door, a door frame) etc. The following description of seal assembly 10 is with reference to seal assembly 10 being used as side member 28b. However, additionally or alternatively, an identical or similar seal assembly 10 can be used as header 28a.

Referring further to FIG. 2, seal assembly 10 of the illustrated example has face panel 12 extending from a projection panel 38 that is attached to wall 22 in proximity with doorway 24. In some examples (but certainly not all), projection panel 38 includes a backer 40 (e.g., a plank) and a resiliently compressible foam core 42 (e.g., polyurethane foam) encased within a pliable protective cover 44 (e.g., chlorosulfonated polyethylene synthetic rubber, canvas duck, rubber-impregnated fabric, coated nylon or polyester fabric, 40-ounce vinyl fabric, vinyl fabric of other weights, other fabric materials, neoprene sheeting, vinyl sheeting, other flexible polymeric sheeting, etc.). For example, angle iron brackets 46 with screws 48 fastened to backer 40 and wall 22 may be employed to mount projection panel 38 to wall 22. The core's resilience enables projection panel 38 to withstand an accidental impact from vehicle 18.

Some examples of face panel 12 include a back sheet 50, a front sheet 52 and flanges 54 and 56. In some examples, sheets 50 and 52 are individual pieces, and in other examples, sheets 50 and 52 are a single piece folded onto itself to form both sheets 50 and 52. In some examples, as shown in FIGS. 2-7 and 10, a tip seal 58 with an elongate casing 60 and a seal flap 62 is positioned or runs along at least a portion of a length of a distal edge 64 of face panel 12. As shown, distal edge 64, tip seal 58 and seal flap 62 extend along a primary length 66 of face panel 12. Casing 60 is positioned or interposed between at least a portion of seal flap 62 and doorway 24 when face panel 12 is in a standby position (e.g., FIG. 2). A suitable fastener couples or connects flanges 54 and 56 to projection panel 38. An example fastener may include, but is not limited to, a touch-and-hold fastener (e.g., VELCRO®—trademark of Velcro Industries of Manchester, N.H.), one or more buttons, snaps, zipper, threads, laces, adhesive welded interfaces, and/or any other suitable fastener(s). Example materials of sheets 50 and 52, flanges 54 and 56, casing 60, and seal flap 62 include, but are not limited to, chlorosulfonated polyethylene synthetic rubber, canvas duck, rubber-impregnated fabric, coated nylon or polyester fabric, 40-ounce vinyl fabric, vinyl fabric of other weights, other fabric materials, neoprene sheeting, vinyl sheeting, other flexible polymeric sheeting, etc.

To provide face panel 12 with sufficient compliance to sealingly conform to various and sometimes irregular features of the vehicle's rear portion 16, some examples of face panel 12 include a first seam 68a and a second seam 68b positioned adjacent to where front sheet 52 adjoins back sheet 50. More specifically, front sheet 52, in the area between seams 68a and 68b, is materially wider (e.g., has a longer length) than back sheet 50 between seams 68a and 68b to enable front sheet 52 to bulge outward away from back sheet 50. Additional seams 68c, 68d and 68e can help couple or connect other face panel parts, such as casing 60, seal flap 62, and flanges 54 and 56. The term, "seam" means a line of contact (or equivalent thereof, e.g., an effective line of contact such as a dotted line or an interface of indirect contact) between adjoining surfaces or abutting edges, where the adjoining surfaces or abutting edges are not necessarily connected. In some examples, however, the adjoining surfaces or abutting edges are connected at the seam. In some examples, the seam is a continuous or intermittent elongate joint (e.g., a generally linear joint) that may or may not include an additional intermediate joining piece (e.g., an intermediate piece such as double-sided tape for bonding one sheet to another). Examples of seams 68 (e.g., seams 68a-h) include, but are not limited to, one or more strings of thread providing a sewn connection, a series of rivets, a series of snaps, a welded joint, a zippered joint, a hook-and-loop fastener (e.g., VELCRO® connecting sheets 50 and 52, wherein VELCRO® is a registered trademark of Velcro USA Inc., of Manchester, N.H.), double-sided tape, an adhesive joining two pieces, a front sheet adjoining but unconnected to a back sheet, a front sheet adjoining a foam core, a front sheet adjoining a backer, etc.

The bulging of front sheet 52 relative to back sheet 50 forms blister 14. Blister 14 provides or defines an elongate chamber 70 containing a variable volume of fluid or air 72 between sheets 52 and 50. Chamber 70 is substantially vertically elongate when face panel 12 is part of side member 28b and is substantially horizontally elongate when part of header 28a. In various examples, elongate chamber 70 is open at one end, open at both opposite ends, and/or open at intermediate points between the opposite ends to place the volume of air 72 in open fluid communication with surrounding ambient air outside of seal assembly 10. With chamber 70 being open at each opposite end, for example, uppermost and lowermost ends of chamber 70 are open (e.g., in fluid communication with the ambient air) when chamber 70 is oriented vertically (e.g., substantially vertically) (e.g., when the seal assembly 10 is employed in the example of side members 28b). Chamber 70 being open to ambient air maintains the air in chamber 70 at atmospheric pressure, and thus prevents otherwise possible internal positive air pressure from hindering the flexibility and/or normal compliance of blister 14.

The compliance and sealing effectiveness of the blister 14 is illustrated in FIGS. 3-6. As vehicle 18 first engages face panel 12 upon vehicle 18 moving from its standby position of FIG. 3 to a deflected position of FIG. 4, blister 14 conforms to, for example, door hardware 36 and/or other features and/or surfaces of the vehicle's rear portion 16. As vehicle 18 deflects face panel 12 from a standby position (e.g., FIG. 2) to a deflected position (e.g., FIG. 4), blister 14 distorts such that the variable volume of air 72 shifts between second seam 68b and first seam 68a. For example, air 72 may shift from second seam 68b toward first seam 68a, thereby reducing the volume of air 72 immediately adjacent to second seam 68b and increasing the volume of air 72 immediately adjacent to first seam 68a. Some volume of air 72 may flow through or across one of the open ends of blister 14.

As vehicle 18 moves further back into dock shelter 28 from the face panel's deflected position of FIG. 4 to another or further deflected position of FIG. 5, the air 72 continues to shift and/or displace between seams 68a and 68b. From the deflected position of FIG. 5, continued movement of vehicle 18 toward wall 22, as shown in FIG. 6, causes air 72 to shift forward from seam 68a to seam 68b, which allows blister 14 to continue and/or further conform against the vehicle's rear portion 16 to provide a seal between vehicle 18 and seal assembly 10. FIG. 6 also shows that in some cases a deflected position of face panel 12 also positions or places tip seal 58 (e.g., seal flap 62) in sealing engagement with vehicle 18. As air 72 shifts between seams 68a and 68b, some air 72 may enter or leave chamber 70 through one or more of the chamber's open ends.

Figure 7:
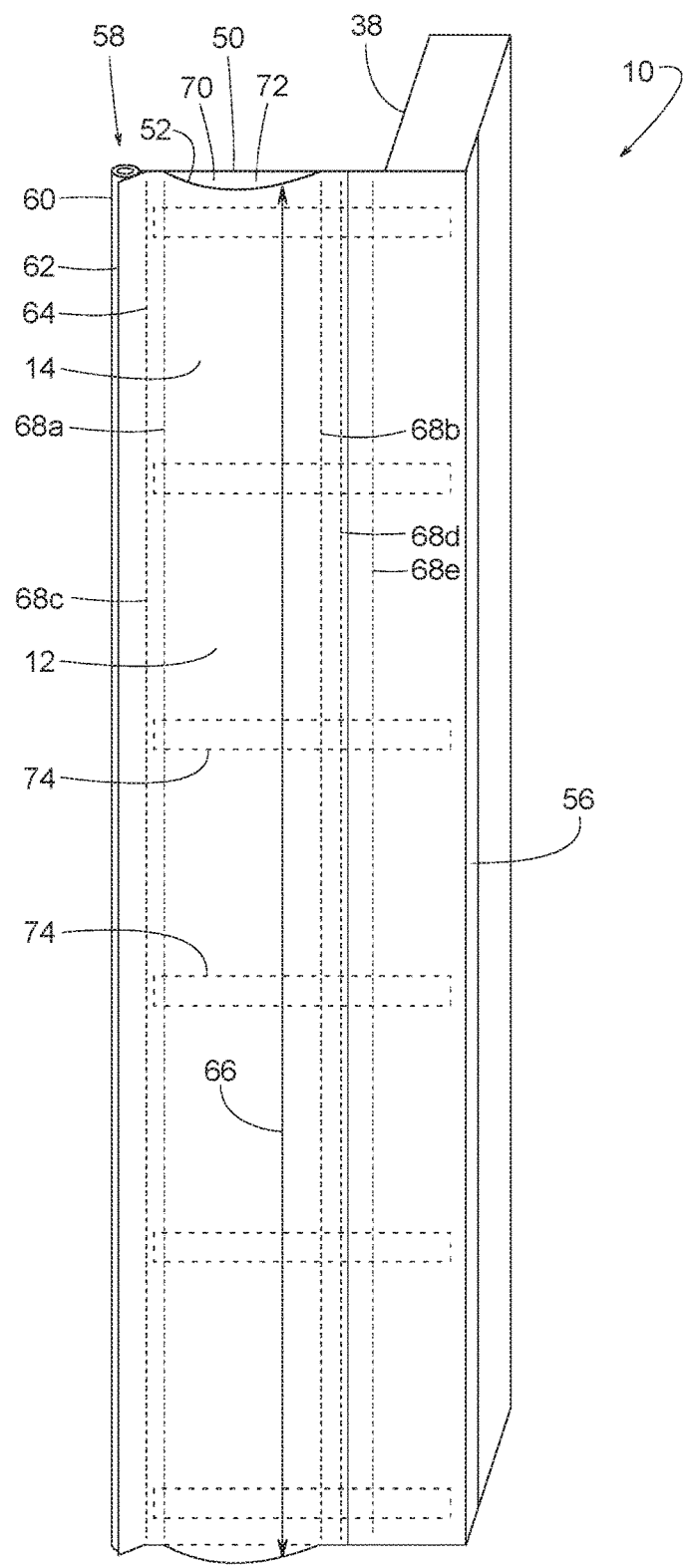
FIG. 7 is a perspective view of the example seal assembly shown in FIGS. 2-6.
Figure 8:
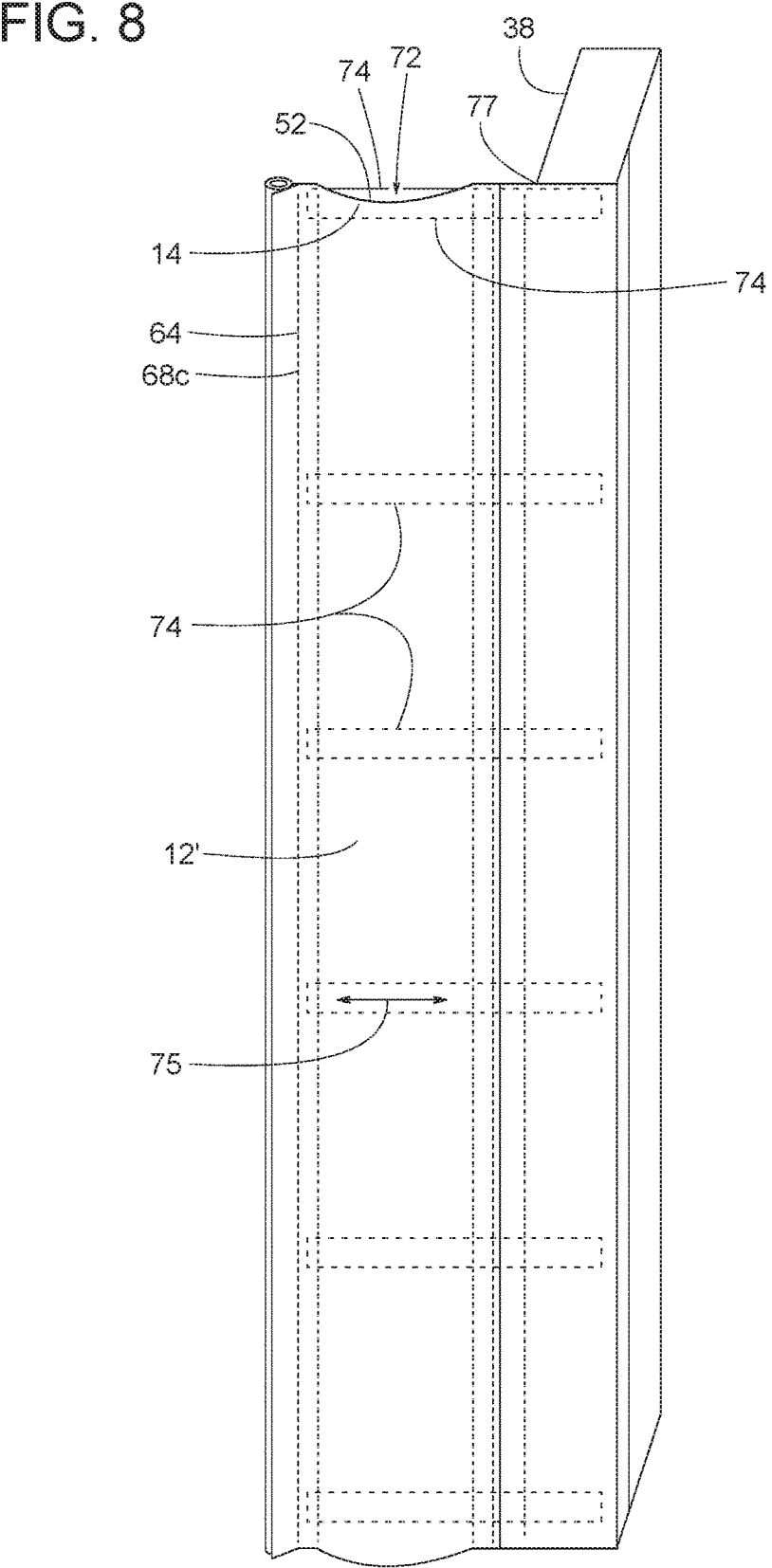
FIG. 8 is a perspective view similar to FIG. 7, but showing another example seal assembly disclosed herein.

Some examples of seal assembly 10, as shown in FIGS. 7 and 8, include a plurality of ribs or stays 74 for providing additional stiffness or resilience to face panel 12 (FIG. 7) or a face panel 12' (FIG. 8). For example, referring to FIG. 8, stays 74 are elongate in a longitudinal direction 75 and extend in direction 75 from a point of attachment 77 toward distal edge 64. Point of attachment 77 may be, for example, where face panel 12' adjoins projection panel 38, any position between flanges 54 and 56, etc. Examples of point of attachment 77 include, but are not limited to, a single point, a plurality of points, a continuous line, an intermittent line, a planar surface, etc. In some examples, to make stays 74 stiffer than front sheet 52, stays 74 are made of fiberglass strips about 0.125 inches thick, 1.5 inches wide and about 2 to 3 feet long. In the example shown in FIG. 8, stays 74 hold front sheet 52 in a bowed shape without assistance from any back sheet, thus back sheet 50 is omitted. Sheet 52 bowing away from stays 74 creates blister 14, which contains or defines variable volume of air 72 between front sheet 52 and stays 74. In some cases, air 72 shifts between distal edge 64 and point of attachment 77 in reaction to vehicle 18 deflecting face panel 12' from a standby position (e.g., FIG. 3) to a deflected position (e.g., FIGS. 5 and 6).

Figure 9:
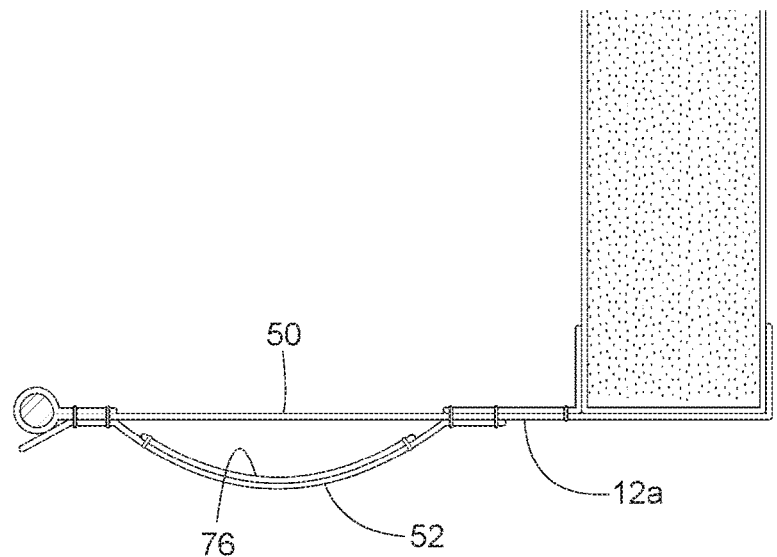
FIG. 9 is a cross-sectional view similar to FIG. 2, but showing another example seal assembly disclosed herein.

To provide blister 14 with greater stiffness or durability, an example face panel 12a shown in FIG. 9 includes a layer of reinforcement 76 attached to an inner of front sheet 52. Additionally or alternatively, the layer of reinforcement 76 may be attached to an outer surface of the front sheet 52. In some examples, reinforcement 76 is made of a similar material and similar thickness as front sheet 52.

Figure 10:
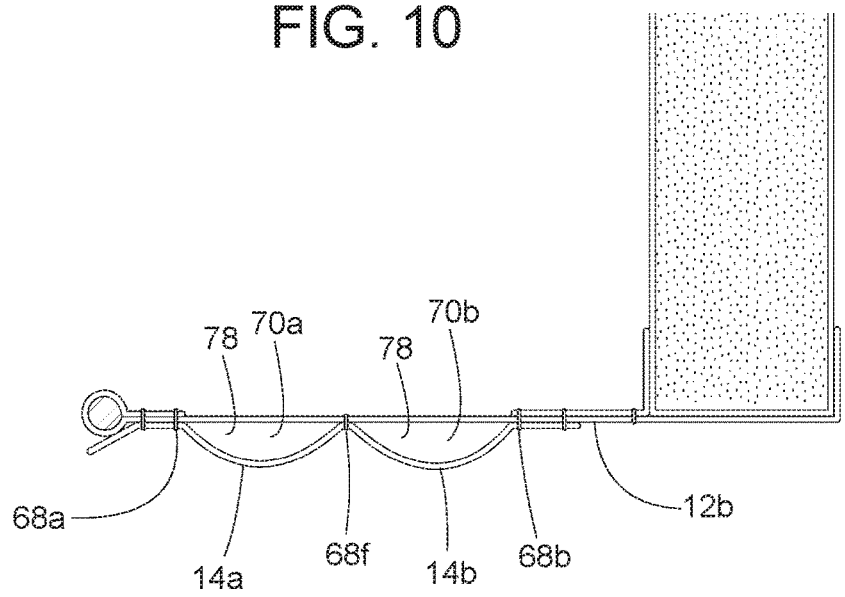
FIG. 10 is a cross-sectional view similar to FIG. 2, but showing yet another example seal assembly disclosed herein.

In some examples, as shown in FIG. 10, a face panel 12b includes first seam 68a, second seam 68b and a third seam 68f to create two blisters 14a and 14b defining two elongate chambers 70a and 70b, each of which define a variable volume of air 78. Such a multi-blister design may provide a more effective seal in some cases. Examples shown in FIGS. 11, 12 and 13 show alternate construction details of the examples shown in FIGS. 2, 9 and 10, respectively.

The example face panels (e.g., face panels 12, 12', 12a and 12b) disclosed herein may include a tip seal disposed along the face panel's distal edge (e.g., along distal edge 64). Various example tip seals are shown in FIGS. 14-22. FIG. 14 shows tip seal 58 comprising seal flap 62, elongate casing 60 in a loop form and an elongate stiffener 80 disposed within casing 60. In some examples, elongate stiffener 80 is a one-inch diameter foam cord (e.g., polyolefin foam). Example materials of casing 60 include, but are not limited to, chlorosulfonated polyethylene synthetic rubber, canvas duck, rubber-impregnated fabric, coated nylon or polyester fabric, 40-ounce vinyl fabric, vinyl fabric of other weights, other fabric materials, neoprene sheeting, vinyl sheeting, other flexible polymeric sheeting, etc.

A tip seal 58a with a seal flap 82, shown in FIG. 15, is similar to tip seal 58 of FIG. 14. However, instead of one continuous seal flap 62, seal flap 82 includes a plurality of tabs 84 and slits 86. Tabs 84 and slits 86 provide seal flap 82 with greater flexibility and freedom of movement to fit around various vehicle irregularities such as light 34 and door hardware 36 or any other surface irregularities of the rear portion 16.

Referring to FIG. 16, another example tip seal 58b, similar to tip seal 58, includes a seal flap 84 that is actually an integral part or portion of an outer casing 86 that encircles at least most of an inner elongate casing 88, wherein inner casing 88 contains foam cord 80. Cord 80 and inner casing 88 of FIG. 16 is similar to elongated stiffener 80 and casing 60 of FIG. 14 in that little if any radial gap exists between cord 80 and casing 88. The relatively tight radial fit between cord 80 and casing 88 provides tip seal 58b with some relative stiffness, shape and/or form. An appreciable radial gap 90 (e.g., about 0.1 to 0.3 inches), however, does exist between casings 86 and 88 to provide tip seal 58b with greater flexibility and freedom of movement than that which would otherwise be achieved if there were no radial gap 90 at that location.

In the example shown in FIG. 17, a tip seal 58c comprises a seal flap 92 in the form of a loop with no cord inside the loop. To provide tip seal 58c with flexibility and freedom of movement, seal flap 92 includes a plurality of slits 94.

FIG. 18 illustrates a tip seal 58d similar to tip seal 58c of FIG. 17. However, tip seal 58d includes an elongate stiffener 95 that is in a smaller loop form than the loop form of an outer casing 86'. Stiffener 95 has a plurality of slits 94' to provide tip seal 58d with flexibility and freedom of movement. Slits 94 in outer casing 86' and slits 94' in stiffener 95 are vertically staggered relative to each other to help seal off air gaps that slits 94 and 94' would otherwise create through tip seal 58d.

The example shown in FIG. 19 illustrates a tip seal 58e similar to tip seal 58c of FIG. 17. However, tip seal 58e has no slits 94 and includes an elongate stiffener 98 that is in a smaller loop form than the loop form of outer casing 86. In the example shown in FIG. 20, a tip seal 58f is similar to tip seal 58c of FIG. 17 but with the addition of seal flaps 95 and 96.

The example shown in FIG. 21 illustrates a tip seal 58g similar to tip seal 58e of FIG. 19. However, tip seal 58g includes a generally planar stiffener 100 instead of the loop-style stiffener 98 of FIG. 19. In the example shown in FIG. 22, a tip seal 58h is similar to tip seal 58g of FIG. 21 in that they both include the generally planar stiffener 100. However, instead of loop-style outer casing 86, tip seal 58h includes two seal flaps 102 and 104.

Figure 23:
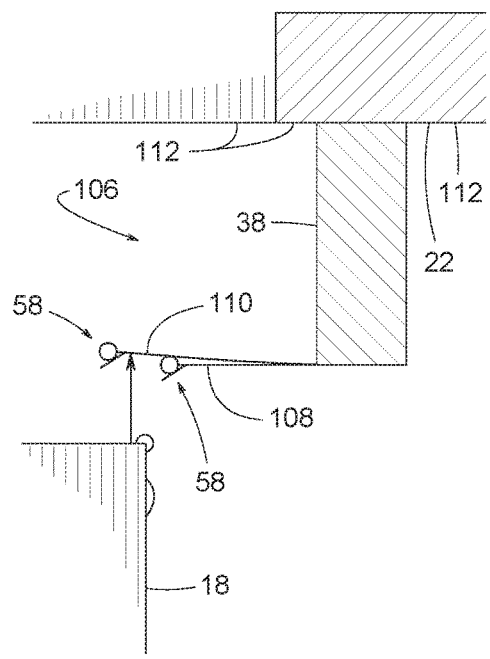
FIG. 23 is a cross-sectional view similar to FIG. 3, but showing another example seal assembly disclosed herein in a standby position just prior to moving to a first deflected position.
Figure 24:
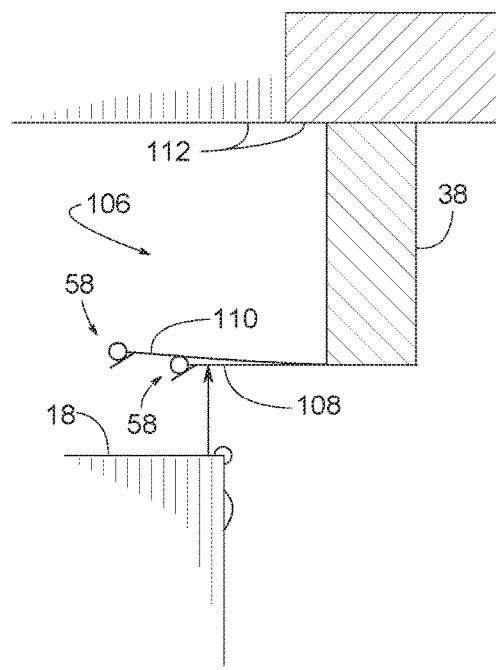
FIG. 24 is a cross-sectional view similar to FIG. 23, but showing the seal assembly of FIG. 23 just prior to moving to a second deflected position.
Figure 25:
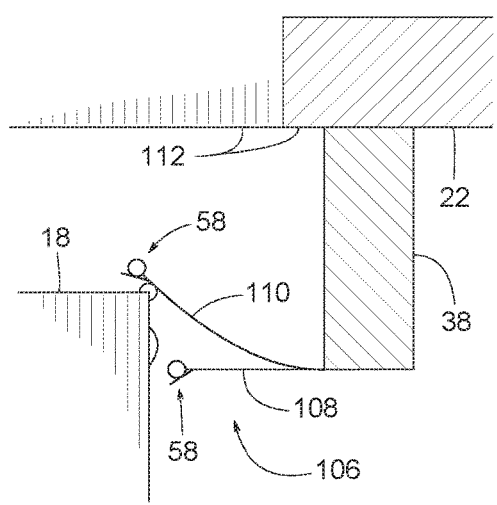
FIG. 25 is a cross-sectional view similar to FIG. 23, but showing the seal assembly in the first deflected position.
Figure 26:
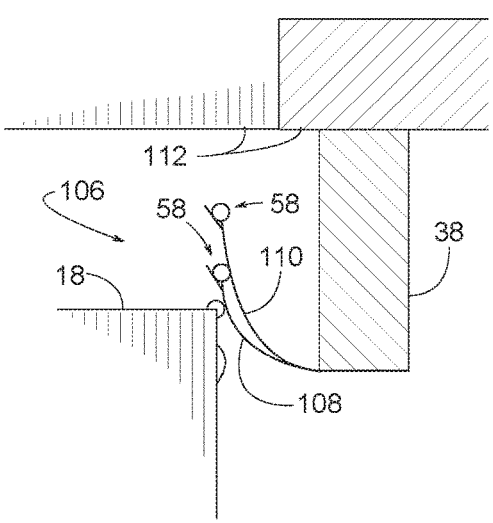
FIG. 26 is a cross-sectional view similar to FIG. 24, but showing the seal assembly in the second deflected position.

FIGS. 23-28 show another example seal assembly 106 described herein. Seal assembly 106 includes multiple overlapping face panels, e.g., a first face panel 108 and a second face panel 110. With seal assembly 106 having multiple face panels 108 and 110, vehicle 18 can deflect or move seal assembly 106 from a standby position of FIGS. 23, 24 and 27 to first and second deflected positions, as shown in FIGS. 25 and 26, respectively. FIG. 28 shows another example of a second deflected position. In the deflected position of FIG. 28, both face panels 108 and 110 sealingly engage a side surface of vehicle 18. The various positions of seal assembly 106 are with respect to projection panel 38 and an imaginary plane 112 defined by and parallel to wall 22.

Some examples of face panels 108 and 110 include a blister, such as blisters 14, 14a or 14b. In other examples, as shown in FIGS. 23-28, face panels 108 and 110 have no such blister. In any case, multiple offset face panels 108 and 110 can enhance the sealing against vehicle 18 and/or accommodate lateral misalignment between vehicle 18 and seal assembly 106. In FIG. 23 (standby position), for instance, vehicle 18 is biased away from projection panel 38, yet tip seal 58 of second face panel 110 can still engage and seal against vehicle 18, as shown in FIG. 25 (first deflected position). If vehicle 18 is biased toward projection panel 38, as shown in FIG. 24, vehicle 18 can deflect both face panels 108 and 110, as shown in FIG. 26 (second deflected position). With seal assembly 106 in the second deflected position of FIG. 26, vehicle 18 engages and sealingly contacts at least one of side panels 108 and 110, and in some cases, further seals against at least one of the two tip seals 58. Some examples of tip seals 58 include, but are not limited to, those illustrated in FIGS. 14-22.

In some examples, as shown in FIGS. 29 and 30, a seal assembly 106' includes a web 109 extending between distal edges of face panels 108 and 110. In some cases, as vehicle 18 deflects seal assembly 106' from its standby position of FIG. 29 to its deflected position of FIG. 30, web 109 enhances the sealing between vehicle 18 and seal assembly 106'.

FIGS. 31 and 32 show an example seal assembly 114 including projection panel 38, a face panel 116, and a tip seal 118. Face panel 116 includes blister 14 defining chamber 70 with the variable volume of air 72. Tip seal 118, however, is sufficiently rigid to provide a backstop that can hold a bulging portion 120 of blister 14 over a door hinge gap at the rear edge of vehicle 18. The bulging portion 120 may develop in response to vehicle 18 deflecting face panel 116 from a standby position of FIG. 31 to a deflected position of FIG. 32.

Figure 33:
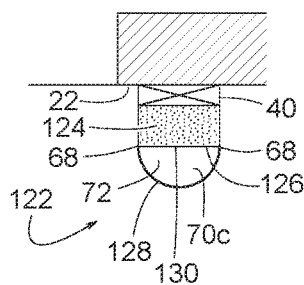
FIG. 33 is a cross-sectional top view similar to FIG. 3, but showing another example seal assembly disclosed herein.
Figure 34:
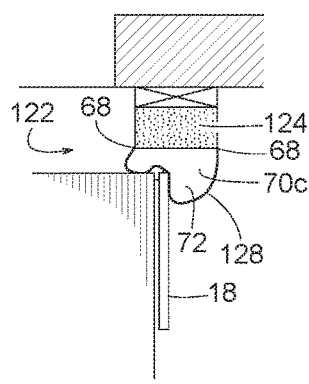
FIG. 34 is a cross-sectional top view similar to FIG. 33, but showing a vehicle backed against the example seal assembly of FIG. 33.

FIGS. 33-53 show various examples of seal assemblies with blisters, where the example seal assemblies function more as dock seals than as dock shelters. FIG. 33 shows an example seal assembly 122 in a standby position, and FIG. 34 shows seal assembly 122 in a deflected position. In this example, a seal assembly 122 comprises backer 40, a resiliently compressible foam core 124 (similar to core 42), a pliable protective cover 126 (similar to cover 44), and a front sheet 128 extending between first and second seams 68. Front sheet 128 bulges outward between the two seams 68 to create an elongate chamber 70c with a variable volume of air 72 between front sheet 128 and a portion 130 of cover 126. In the deflected position, the bulging portion 120 of the blister 14 seals along a first portion of vehicle 18 (e.g., the door hinge gap) and another portion of the blister 14 seals along a second portion of vehicle 18 (e.g., the side of the vehicle).

In the example of seal assembly 122, portion 130 of cover 126 is considered a "back sheet," and backer 40 alone and/or in combination with core 124 is considered a "projection panel" in that backer 40 and core 124 each extend outward from wall 22. A similar back sheet and/or backer construction applies to other example seal assemblies shown in FIGS. 35-53. Example materials of cover 126 and sheet 128 include, but are not limited to, chlorosulfonated polyethylene synthetic rubber, canvas duck, rubber-impregnated fabric, coated nylon or polyester fabric, 40-ounce vinyl fabric, vinyl fabric of other weights, other fabric materials, neoprene sheeting, vinyl sheeting, other flexible polymeric sheeting, etc. Such example materials for covers and sheets are also used in some examples of the seal assemblies shown in FIGS. 35-53. As vehicle 18 backs into seal assembly 122, sheet 128 deforms to seal against vehicle 18, as shown in FIG. 34. If vehicle 18 backs further into seal assembly 122, core 124 can deform as well.

In some examples of seal assembly 122, elongate chamber 70c is open at one end, open at both opposite ends, and/or open at intermediate points between the opposite ends to place the volume of air 72 in open fluid communication with surrounding ambient air outside of seal assembly 122. Because chamber 70c is open at each opposite end, for example, the uppermost and lowermost ends of chamber 70c are open when chamber 70c extends substantially vertically (e.g., when seal assembly 122 is used as a side member rather than a header). Chamber 70c being open to ambient air maintains the air in chamber 70c at atmospheric pressure and thus prevents otherwise possible internal positive air pressure from hindering the flexibility or normal compliance of the blister created by bulging sheet 128. This same principle of having chamber 70c open to ambient air, and thus maintained at atmospheric pressure, can apply to other examples of seal assemblies shown in FIGS. 35-53.

Figure 35:
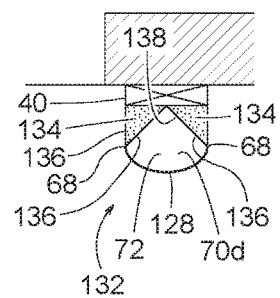
FIG. 35 is a cross-sectional top view similar to FIG. 33, but showing another example seal assembly disclosed herein.

In the example of FIG. 35, a seal assembly 132 comprises backer 40, a resiliently compressible foam core 134 in a double V-shape (single or multi-piece core), a pliable protective cover 136 (similar to cover 44), and front sheet 128 extending between first and second seams 68. The double V-shape of core 134 creates an elongate chamber 70d between cover 136 and front sheet 128 and further between the two seams 68. Elongate chamber 70d has a variable volume of air 72 between front sheet 128 and a portion 138 of cover 136. As vehicle 18 backs into seal assembly 136, core 134 is compressed and sheet 128 deforms into chamber 70d to seal against vehicle 18.

Figure 36:
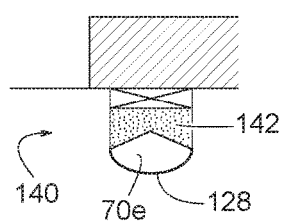
FIG. 36 is a cross-sectional top view similar to FIG. 33, but showing another example seal assembly disclosed herein.

FIG. 36 shows an example seal assembly 140 that is similar to seal assembly 132 of FIG. 35. However, seal assembly 140 has a core 142 and a chamber 70e with slightly modified shapes to provide different sealing characteristics that might be better in some situations.

Figure 37:
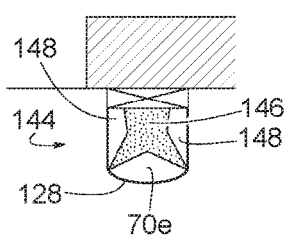
FIG. 37 is a cross-sectional top view similar to FIG. 33, but showing another example seal assembly disclosed herein.

FIG. 37 shows an example seal assembly 144 that is similar to seal assembly 140 of FIG. 36. However, seal assembly 144 has a core 146 with a modified shape to create additional air chambers 148 that might provide different (e.g., increased) sealing in some situations.

Figure 38:
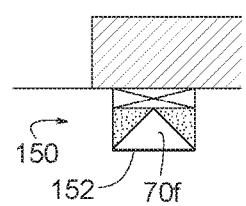
FIG. 38 is a cross-sectional top view similar to FIG. 33, but showing another example seal assembly disclosed herein.

FIG. 38 shows an example seal assembly 150 that is similar to seal assembly 132 of FIG. 35. However, seal assembly 150 has a front sheet 152 that is flatter that sheet 128 of FIG. 35. Front sheet 152 being relatively flat creates an elongate air chamber 70f that has a relatively smaller volume and/or a different cross-sectional shape for relatively better sealing in some situations.

Number 39 shows an example seal assembly 154 that is similar to seal assembly 132, of FIG. 35. However, seal assembly 154 has a front sheet 156 that is held pinched together at a central seam 158. Front sheet 156 being in such a shape creates an elongate air chamber 70g having a "double-bubble" cross-sectional shape for relatively better sealing in some situations. In some cases, for example, one "bubble" might seal against the rear surface or cover the door hinge area of a vehicle while the other "bubble" might seal against the vehicle's side surface.

Figure 40:
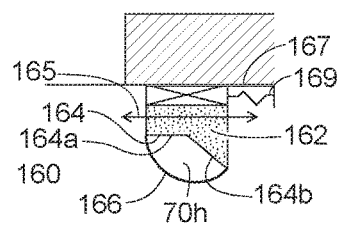
FIG. 40 is a cross-sectional top view similar to FIG. 33, but showing another example seal assembly disclosed herein.

FIG. 40 shows an example seal assembly 160 that is somewhat of a hybrid of seal assembly 122 of FIG. 33 and seal assembly 140 of FIG. 36. Seal assembly 160 has a foam core 162 with a forward facing surface 164 that is flat on one side 164a (similar to core 124) and beveled on the other side 164b (similar to core 140). A bowed front sheet 166 (similar to sheet 128) creates an elongate air chamber 70h between sheet 166 and surface 164 (e.g., surfaces 164a and 164b). Air chamber 70h has a cross-sectional shape for relatively better sealing in some situations. As an alternative to the fixed mounting of the seal assembly 10 to the wall 22, the seal assembly 10 can be mounted for horizontal shifting or sliding movement relative to the wall 22 in the direction of arrow 165. For example, a track 167 may be employed to enable shifting or movement of the seal assembly 10 relative to the wall 22 in the direction of arrow 165. Further, a biasing element 169 may be employed bias or urge the seal assembly 10 towards the doorway 24 in a direction along arrow 165.

Figure 41:
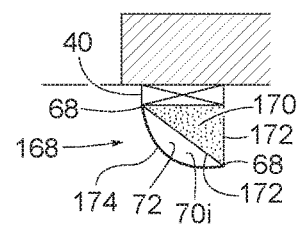
FIG. 41 is a cross-sectional top view similar to FIG. 33, but showing another example seal assembly disclosed herein.
Figure 42:
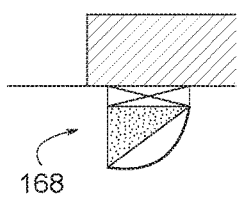
FIG. 42 is a cross-sectional top view similar to FIG. 33, but showing another example seal assembly disclosed herein.

FIG. 41 shows an example seal assembly 168 comprising backer 40, a resiliently compressible foam core 170 (similar to core 42 but in a triangular shape), a pliable protective cover 172 (similar to cover 44), and a front sheet 174 extending between first and second seams 68. Front sheet 174 bulges outward between the two seams 68 to create an elongate chamber 70i with a variable volume of air 72. FIG. 42 shows seal assembly 168 in a different orientation. In either position, as vehicle 18 backs into seal assembly 168, core 170 is compressed and sheet 174 deforms into chamber 70i to seal against vehicle 18.

Figure 43:
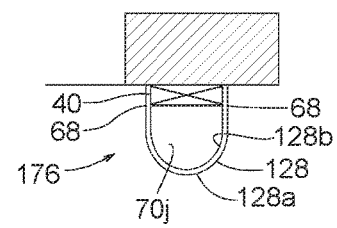
FIG. 43 is a cross-sectional top view similar to FIG. 33, but showing another example seal assembly disclosed herein.

FIG. 43 shows an example seal assembly 176 similar to seal assembly 122 of FIG. 33. Instead of core 124, however, seal assembly 176 achieves structural support and resilience by having two layers 128a and 128b of front sheet 128. A similar double-layer design is shown in FIG. 9. Front sheet 128, comprising layers 128a and 128b, bulges outward between two seams 68 to create an elongate chamber 70j with variable volume of air 72. Omitting core 124 reduces costs and eliminates the need for protecting such a core from moisture and wear.

Figure 39:
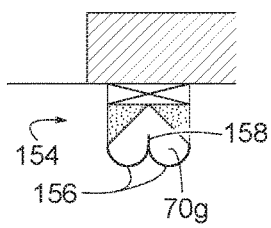
FIG. 39 is a cross-sectional top view similar to FIG. 33, but showing another example seal assembly disclosed herein.
Figure 44:
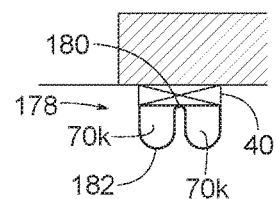
FIG. 44 is a cross-sectional top view similar to FIG. 33, but showing another example seal assembly disclosed herein.

FIG. 44 shows an example seal assembly 178 similar to seal assembly 154 of FIG. 39. With seal assembly 178, however, the foam core is omitted and a seam 180 connects a central region of a front sheet 182 to backer 40 to create two elongate chambers 70k each with variable air volume 72. Omitting the foam core and having two chambers 70k provide advantages found in seal assembly 154 of FIG. 39 and seal assembly 176 of FIG. 43.

FIGS. 45 and 46 show an example seal assembly 184 similar to seal assembly 168 of FIG. 41, but with an added shield 186. FIG. 45 shows seal assembly 184 in a standby position, and FIG. 46 shows seal assembly 184 in a deflected position. In the illustrated example, seal assembly 184 comprises backer 40, foam core 170, protective cover 172 overlying core 170, a front sheet 188 and shield 186. Front sheet 188 bows outward from core 170 and extends between two seams 68f and 68g with an intermediate seam 68h therebetween. Seam 68h couples or connects front sheet 188 to an intermediate point on shield 186. Sheet 188 bulges outward to create an elongate chamber 70m with air volume 72. As vehicle 18 backs into seal assembly 184 as shown in FIG. 46, sheet 188 deforms to seal against vehicle 18. As sheet 188 deforms, movement of the sheet 188 draws shield 186 toward an interior surface 190 of vehicle 18, whereby shield 186 and sheet 188 cover and seal the air gap at the vehicle's door hinge 192.

To provide seal assembly 184 with greater resilience to ensure seal assembly 184 returns to a standby position (e.g., a non-deflected position) after vehicle 18 departs, a stiffener 194 is added to seal assembly 184 to urge shield 186 to return the position shown in FIG. 47. Stiffener 194 is schematically illustrated to represent any structure that can urge shield 186 to the standby position of FIG. 47. Examples of stiffener 194 include, but are not limited to, a resilient piece of polymeric material (e.g., fiberglass, polyurethane, foam, rubber, etc.), spring steel, a torsion spring, etc.

FIG. 48 shows an example seal assembly 196 that is similar to seal assembly 176 of FIG. 43, but includes shield 186 and a web 198. Seal assembly 196 includes backer 40, front sheet 128, shield 186, and web 198. The web 198 extends from shield 186 to front sheet 128. Front sheet 128 extends between two seams 68 and bows outward from backer 40 to create chamber 70*j*. As vehicle 18 backs into seal assembly 196, front sheet 128 sealingly conforms to the contour of vehicle 18, web 198 wraps across the air gap at the vehicle's door hinge 192, and shield 186 gets pulled against the vehicle's interior surface 190 in a manner similar to that shown in FIG. 46.

In another example, shown in FIGS. 49-51, a seal assembly 200 comprises backer 40, an L-shaped resilient foam core 202, a protective cover 204 encasing core 202, and a front sheet 206. Front sheet 206 extends between two seams 68 and bulges forward to create an elongate chamber 70*n* with variable volume of air 72. FIG. 49 shows seal assembly 200 in a standby position, FIG. 50 shows assembly 200 in a first deflected position, and FIG. 51 shows assembly 200 in another deflected position. In the first deflected position shown in FIG. 50, front sheet 206 seals against a side surface 208 of vehicle 18. In the illustrated example, side surface 208 is the interior surface of the vehicle's open rear door 210. In the second deflected position, shown in FIG. 51, front sheet 206 deforms to seal against side surface 208 and cover the air gap at the vehicle's door hinge 192.

FIGS. 52 and 53 show an example seal assembly 212 that is an example or partial hybrid of seal assembly 168 of FIG. 41 and seal assembly 10 of FIGS. 3-6. Seal assembly 212 comprises backer 40, foam core 170, cover 172 and a face panel 214. Face panel 214, in some examples, includes a front sheet 216, a back sheet 218 and tip seal 58. Front sheet 216 extends between two seams 68 and bulges away from back sheet 218 to create an elongate chamber 70*p* with variable volume of air 72. When vehicle 18 backs into seal assembly 212, face panel 216 compliantly seals against vehicle 18 in a manner similar to face panel 28 of FIGS. 3-6 and core 170 deforms or otherwise reacts in a manner similar to core 170 of FIG. 41. In some examples, a stiffener 218 is provided to seal assembly 212 to urge face panel 216 to the position shown in FIGS. 52 and 53 (e.g., a standby position or non-deflected position). Stiffener 218 is schematically illustrated to represent any structure that can urge face panel 216 to the position of FIGS. 52 and 53. Examples of stiffener 218 include, but are not limited to, a resilient piece of polymeric material (e.g., fiberglass, polyurethane, foam, rubber, etc.), spring steel, a torsion spring, etc.

FIGS. 54-59 illustrated another example seal assembly 5400 constructed in accordance with the teachings disclosed herein. The example seal assembly 5400 of the illustrated example may be employed at a loading dock such as, for example, the loading dock 20 of FIG. 1. The example seal assembly 5400 of the illustrated example includes a face panel 5402 that may be coupled to a wall 22 (FIG. 1) of the loading dock 20 (FIG. 1) via a projection panel such as, for example, the projection panel 38 of the example seal assembly 10 of FIGS. 1-6. Thus, the face panel 5402 may extend from the projection panel in front of a doorway 24 (FIG. 1) when the projection panel is mounted to the wall 22. The face panel 5402 of the illustrated example includes a first or front side 5404 (e.g., oriented toward a vehicle or away from the wall 22) and a second or rear side 5406 (e.g., opposite the first side 5404 and/or oriented toward the wall 22). In some examples, the face panel 5402 includes a front sheet and a rear sheet defining a void (e.g., an empty void) or chamber that may have foam, air, fluid and/or other materials or structures.

The face panel 5402 of the illustrated example includes a tip seal 5408. The tip seal 5408 of the illustrated example includes a deformable portion or bulb 5410 (e.g., a blister) positioned adjacent an edge or distal end 5412 of the face panel 5402 (e.g., a distal end spaced apart from the projection panel). Specifically, at least a portion of the tip seal 5408 and/or the end or edge 5412 of the face panel 5402 is to be positioned adjacent an opening of a doorway 24 (FIG. 1) of the loading dock 20 (FIG. 1). The bulb 5410 of the illustrated example is to project inwardly from the distal end 5412 of the face panel 5402 and toward the opening of the doorway 24 in a pathway of an object 5702 (FIG. 57) or a vehicle 18 (FIG. 1) when the face panel 5402 is coupled the wall 22 of the loading dock 20. In some examples, the face panel 5402 may include an additional deformable portion or bulb. In some examples, the bulb 5410 may include a plurality of bulbs forming separate chambers. For example, the bulb 5410 may be formed similar to the seal assembly 178 of FIG. 44 having two elongate chambers 70*k*. In some examples, the face panel 5402 (e.g., the front side 5404 of the face panel 5402) may include one or more blisters such as, for example, the blisters 14*a* and/or 14*b* shown in FIG. 10 and/or any other blister disclosed herein.

The bulb 5410 of the illustrated example is formed by looping an end 5414 of the face panel 5402 and attaching (e.g., directly or indirectly) the looped end 5414 to the rear side 5406 of the face panel 5402 to form a cavity or chamber 5416 of the bulb 5410. The looped end 5414 of the face panel 5402 may be attached to the rear side 5406 of the face panel 5402 via, for example, a fastener such as threads, a touch-and-loop fastener or VELCRO®, a chemical or bonding agent such as glue, and/or any other fastener(s). In some examples, the bulb 5410 is a strip of material different or separate from the face panel 5402 and the bulb 5410 may be formed by attaching or coupling (e.g., via VELCRO® or sewn threads) a first end or edge (e.g., a longitudinal edge) of the strip of material to the front side 5404 of the face panel 5402 and a second end or edge (e.g., a longitudinal edge) of the strip of material to the rear side 5406 of the face panel 5402. As shown in the illustrated example, the bulb 5410 has or forms a circular profile or shape when coupled to the face panel 5402. However, in other examples, the bulb 5410 may have an elliptical profile, an oblong profile, a rectangular profile, a triangular profile and/or any other suitable profile or shape when coupled to the face panel 5402. Further, to provide the tip seal 5408 with added flexibility and/or freedom of movement, the bulb 5410 may include slits or openings along a longitudinal length of the bulb 5410 such as, for example, the slits 94 and/or 94' shown in FIGS. 17 and 18.

The tip seal 5408 of the illustrated example includes an elongate casing 5418 and an elongate cord or stiffener 80 disposed within the casing 5418. The casing 5418 attaches the stiffener 80 to the face panel 5402 via a fastener (e.g., VELCRO®, threads, mechanical and/or chemical fasteners, glue, etc.). In particular, ends 5420 and 5422 of the casing 5418 are positioned and/or captured between the rear side 5406 of the face panel 5402 and the looped end 5414 of the face panel 5402. The stiffener 80 provides the tip seal 5408 with some relative stiffness, shape and/or form. In some examples, the tip seal 5408 and/or the bulb 5410 may be formed substantially similar or identical to the example tip seals 58, 58a, 58b, 58c, 58d, 58e, 58f, 58g, and 58h shown in FIGS. 14-22, respectively. For example, the tip seal 5408 of FIG. 54 may be configured without the elongated casing 5418 and/or the cord 80'. Further, in some examples, the tip seal 5408 stiffener may include a planer stiffener such as, for example, the planar stiffener 100 shown in FIG. 21. In some examples, the tip seal 5408 may be formed with the casing 5418, but without the cord 80.

The tip seal 5408 of the illustrated example also includes a deflectable member or seal flap 5424. The seal flap 5424 of the illustrated example is coupled or mounted to the face panel 5402. Specifically, the seal flap 5424 of the illustrated example includes a first portion 5426 and a second portion 5428. The first and second portions 5426 and 5428 of the illustrated example are integrally formed as a unitary structure (e.g., a unitary or single sheet or panel). When coupled to the face panel 5402, the first portion 5426 of the seal flap 5424 of the illustrated example at least partially wraps around and/or engages (e.g., directly) at least a portion of the bulb 5410, the casing 5418 and/or the face panel 5402 (e.g., the rear side 5406 of the face panel 5402).

Figure 54:
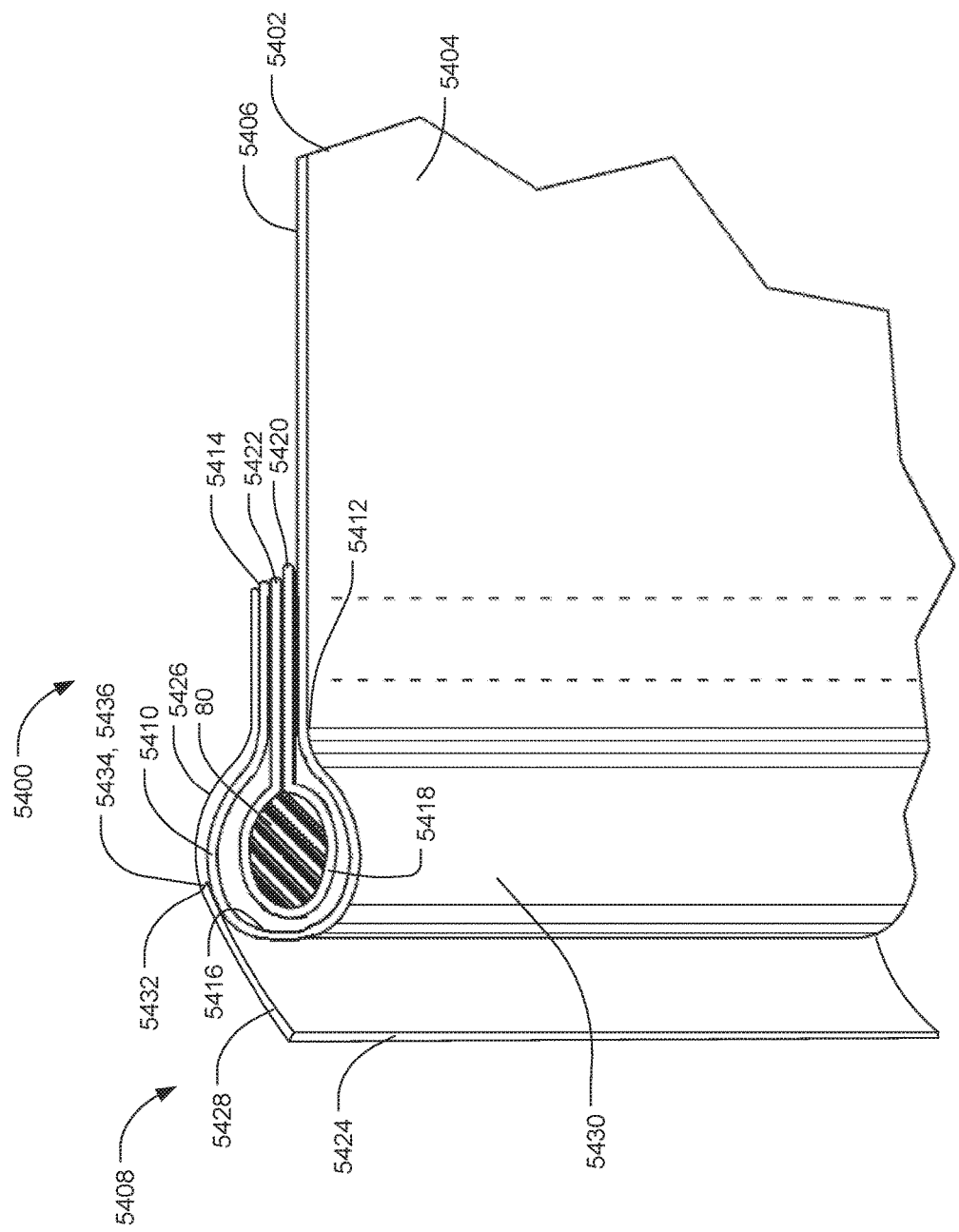
FIG. 54 illustrates another example seal assembly in accordance with teachings disclosed herein.

As shown in FIG. 54, the first portion 5426 of the example seal flap 5424 is attached or coupled to the bulb 5410 of the face panel 5402. In particular, the first portion 5426 of the seal flap 5424 of the illustrated example is attached to an outer surface 5430 of the bulb 5410 such that at least the second portion 5428 of the seal flap 5424 is free to pivot, deflect, bend and/or otherwise move relative to the first portion 5426, the stiffener 80, the face panel 5402, and/or the bulb 5410. More specifically, a portion 5432 of the seal flap 5424 is pinned, fixed, attached and/or otherwise coupled to the bulb 5410 (e.g., to the outer surface 5432 of the bulb 5410) to define a pivot 5434 (e.g., a pivot point) about which the second portion 5428 pivots and/or moves relative to the first portion 5426 of the seal flap 5424, the bulb 5410, the face panel 5402, and/or the stiffener 80. In the illustrated example, the pivot 5434 is formed by sewing the portion 5432 of the seal flap 5424 to the outer surface 5430 of the bulb 5410 via a thread 5436. The example pivot 5434 may be formed or positioned at any location along the outer surface 5430 (e.g., along a perimeter and/or a circumference) of the bulb 5410. In some examples, the portion 5432 between the first and second portions 5426 and 5428 of the seal flap 5424 is coupled and/or attached to the bulb 5410 via other fasteners such as, for example, glue, VELCRO®, pins and/or any other suitable fastener. In some examples, the first portion 5426 is attached or coupled to at least one of the bulb 5410, the casing 5418 and/or the face panel 5402.

Figure 55:
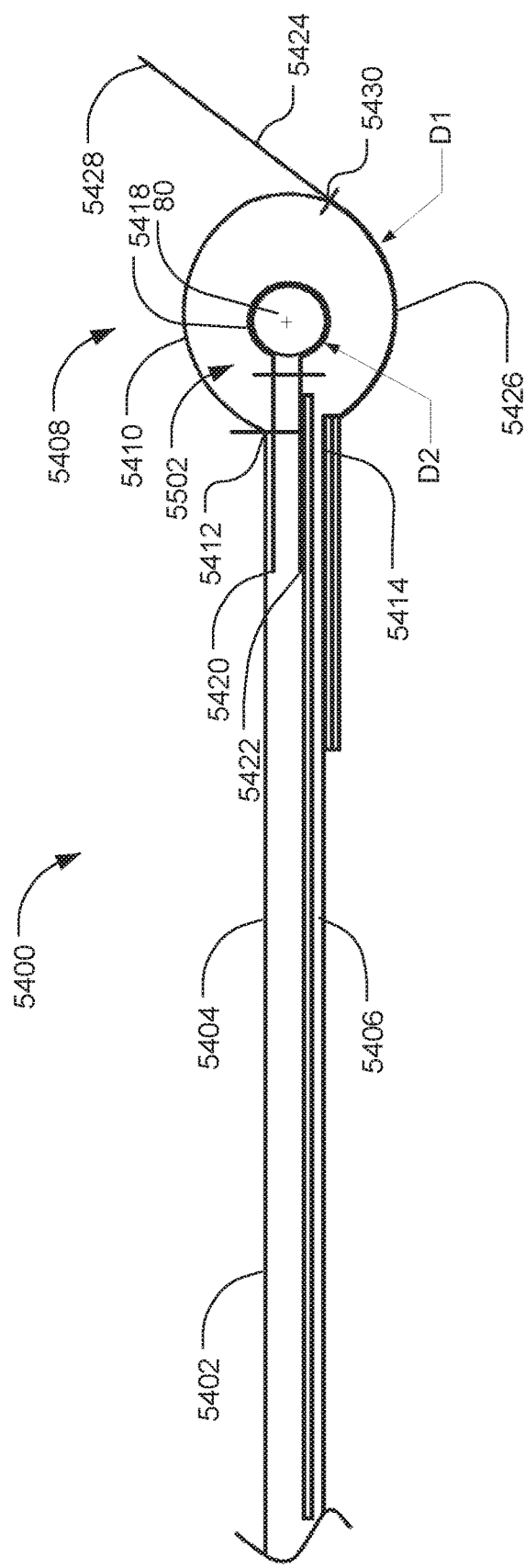
FIG. 55 is a partial top view of the example seal assembly of FIG. 54.

FIG. 55 is a partial, top view of the example seal assembly 5400 of FIG. 54. As shown in FIG. 55, the bulb 5410 of the illustrated example substantially surrounds or encases the stiffener 80. However, although the bulb 5410 of the illustrated example surrounds the stiffener 80, the bulb and/or the seal flap 5424 moves independently and/or substantially independent relative to the stiffener 80 along a first portion of deflection when the bulb 5410 is engaged by an object (e.g., the vehicle 18). For example, when an object engages the bulb 5410 and/or the seal flap 5424, the bulb 5410 and/or the seal flap 5424 deflect and/or otherwise move relative to the stiffener 80 along a first travel portion or path of the vehicle (e.g., between initial contact and twenty percent travel of the vehicle 18 toward the wall 22; between an initial engagement position and a loading/unloading position of the vehicle 18 relative to the loading dock 20, etc.). To enable the bulb 5410 to move independently or substantially independently relative to the stiffener 80, the ends 5420 and 5422 of the casing 5418 are attached, pinched or otherwise coupled between the first side 5404 of the face panel 5402 and the looped end 5414 of the face panel 5402 such that the bulb 5410 and/or the seal flap 5424 can pivot relative to the end 5412 of the face panel 5402.

Additionally or alternatively, to enable the bulb 5410 to move relative to the stiffener 80, a diameter D1 of the bulb 5410 of the illustrated example is substantially greater than a diameter D2 of the stiffener 80. For example, a ratio (D1/D2) between the diameter D1 of the bulb 5410 and the diameter D2 of the stiffener 80 is approximately 4:1. In some examples, the ratio (D1/D2) between the diameter D1 of the bulb 5410 and the diameter D2 of the stiffener 80 and/or the elongated casing 60 ranges between approximately 1.5:1 and 10:1. In other words, an appreciable radial gap 5502 (e.g., between about 0.5 inches and 3 inches) is formed between the stiffener 80 (e.g., an outer surface of the stiffener 80) and the bulb 5410 (e.g., an inner surface of the bulb 5410) to provide a tip seal with greater flexibility and/or freedom of movement than that which would otherwise be achieved if there were no radial gap 5502.

Figure 56:
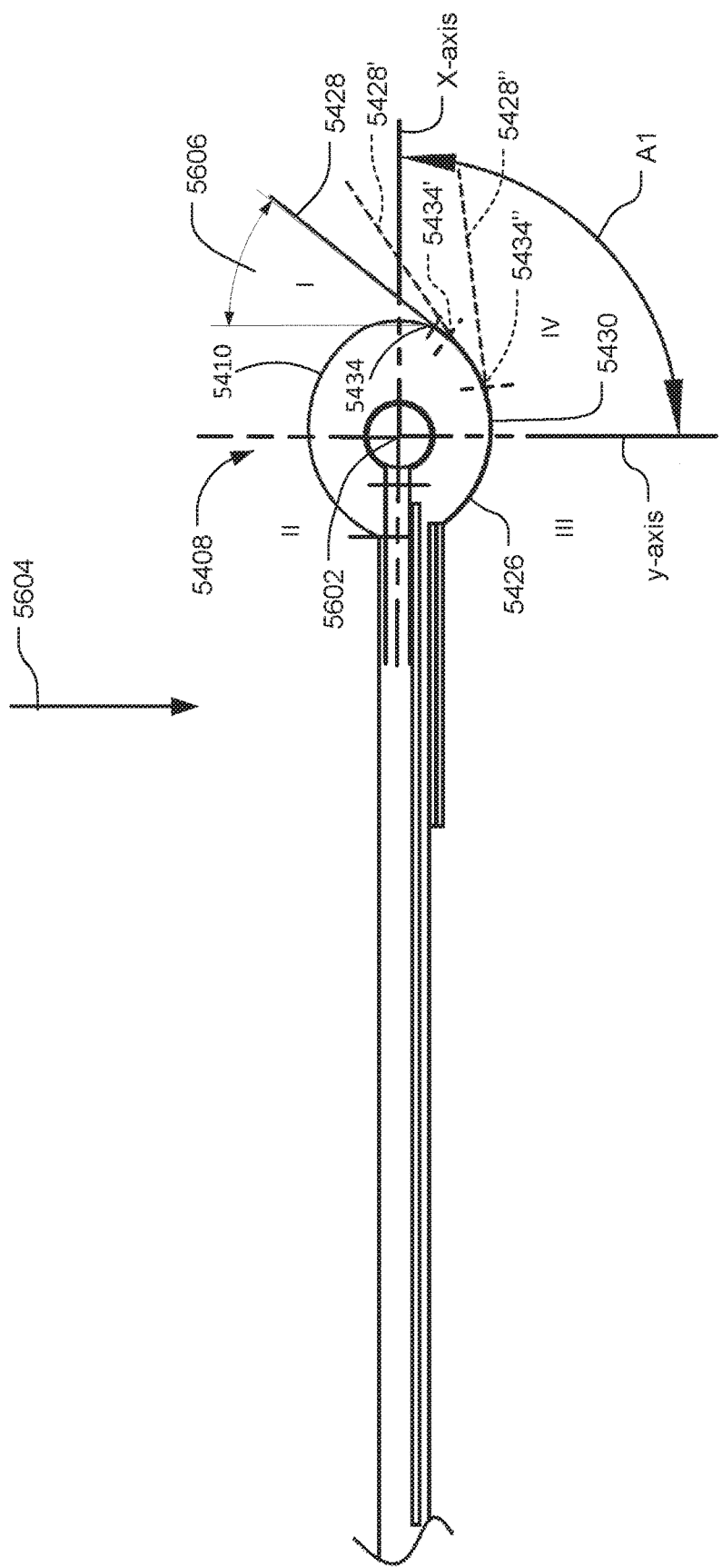
FIG. 56 is another partial top view of the example seal assembly of FIGS. 54 and 55.

FIG. 56 is another partial top view of the example seal assembly 5400 of FIGS. 54 and 55. In the illustrated example of FIG. 56, the pivot 5434 is offset or eccentric relative to a center and/or a longitudinal axis 5602 of the bulb 5410 and/or the stiffener 80. For example, if the center or longitudinal axis 5602 is representative of vertex being at position (0,0) of a 2-dimensional graphical illustration, the pivot 5434 is positioned at a first linear distance along an x-axis in a direction toward the doorway 24 and a second linear distance along the y-axis in a direction toward the wall 22 (i.e., a fourth quadrant IV). For example, the pivot 5434 is positioned within a range of angles A1 (e.g., between 270 degrees and 360 degrees) relative to the center or longitudinal axis 5602 of the bulb 5410. In other words, the pivot 5434 is formed along the outer surface 5430 of the bulb 5410 in an area behind or opposite a direction 5604 of vehicle penetration against the bulb 5410. In some examples, the pivot 5434 may be formed along any portion of the perimeter and/or circumference of the bulb 5410 within the fourth quadrant IV and/or any other quadrant (e.g., a first, second and/or third quadrant, I, II, and III, respectively). In some examples, the pivot 5434 may overlap two or more (e.g., adjacent) quadrants (e.g., the third and the fourth quadrants III and IV, the first and fourth quadrants I and IV, etc.).

As a result, the second portion 5428 of the seal flap 5424 can project away from the bulb 5410 and into a vehicle path to enable engagement between the seal flap 5424 and the vehicle 18 when the vehicle 18 engages the tip seal 5408. In some examples, the second portion 5428 of the seal flap 5424 may be coupled to the bulb 5410 at different locations such as, for example, at a position represented by dashed line 5428' and pivot 5434' or a position represented by dashed line 5428" and pivot 5434". To this end, changing a location of the pivot 5434 enables a different angle of attack 5606 of the seal flap 5624 relative to a vehicle or object path and/or the outer surface 5432 of the bulb 5410. For example, the angle of attack 5606 between the second portion 5428 of the seal flap 5424 and the outer surface 5432 of the bulb 5410 may be less than 90 degrees (e.g., approximately thirty degrees). For example, the location of the pivot 5434' provides an angle of attack that is greater than the angle of attack 5606 (e.g., approximately sixty degrees) provided by the location of the pivot 5434. Further, a weight of the seal flap 5424 may affect the effectiveness of a seal. For example, a heaver seal flap may provide an effective seal with an angle of attack that is less than an angle of attack of a lighter seal flap.

Figure 57:
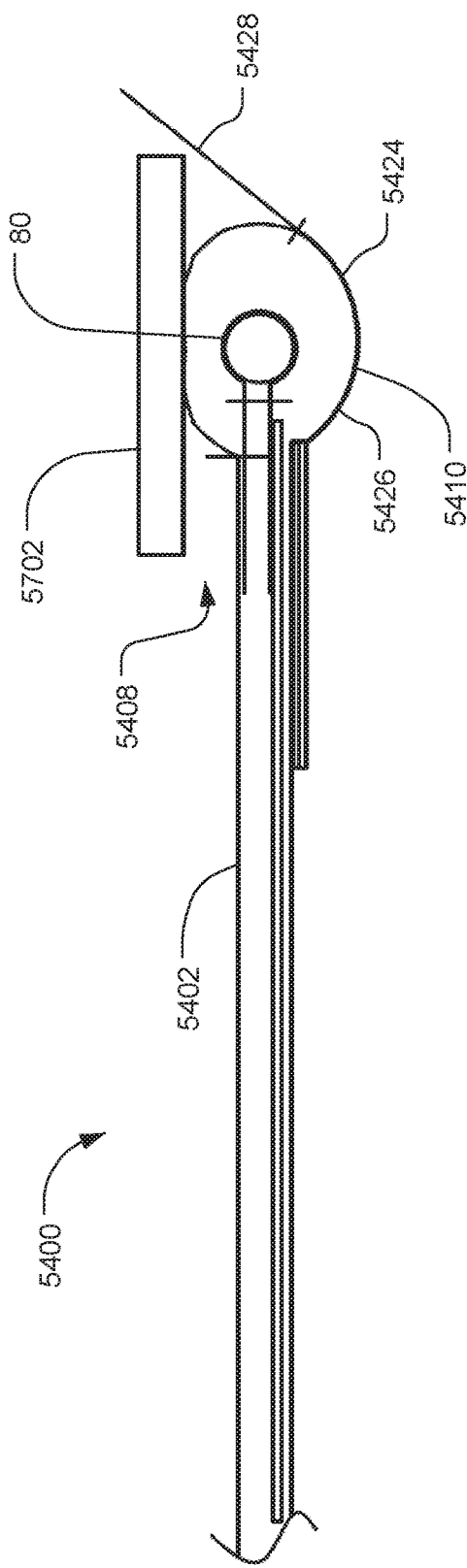
FIGS. 57-59 illustrated various positions of the example seal assembly of FIGS. 54-56.
Figure 58:
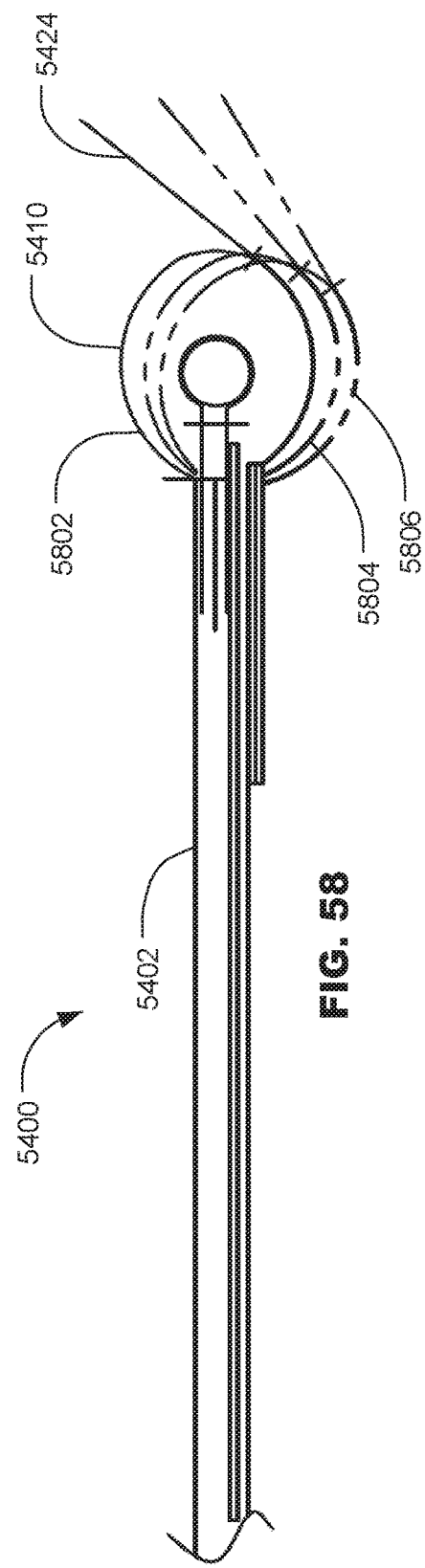

FIGS. 57-59 illustrate various positions of the bulb 5410 and/or the seal flap 5424 when engaged by an object 5702 such as the vehicle 18. Referring to FIG. 57, when the object 5702 engages the bulb 5410, the bulb 5410 deforms and/or otherwise moves relative to the seal flap 5424 and/or the stiffener 80 for a first duration and/or travel path of the object 5702 in the direction 5604 toward the wall 22. Specifically, the bulb 5410 of the illustrated example conforms and/or deforms to obstacles and/or surfaces of the object 5702 when compared to a face panel having a solid edge without the bulb 5410. Thus, in some examples, a volume of air or fluid in the chamber 5416 of the bulb 5410 shifts or adjusts (e.g., decreases or increases) when engaged by the object 5702 to conform (e.g., matably conform or deform) to contours and/or surface profiles of the object 5702. In some examples, the seal flap 5424 and the bulb 5410 may be engaged simultaneously by the object 5702 such that the bulb 5410 and/or the seal flap 5424 move or deflect substantially in unison relative to the stiffener 80. In some examples, the seal flap 5424 may be engaged prior to the object 5702 engaging the bulb 5410 such that the seal flap 5424 moves relative to the bulb 5410 during a first travel path of the object 5702.

FIG. 58 shows different positions of the bulb 5410 and/or the seal flap 5424 relative to the stiffener 80. As noted above, the bulb 5410 and/or the seal flap 5424 may move or deflect relative to the stiffener 80. In some examples, the bulb 5410 and/or the seal flap 5424 deflect relative to the stiffener 80 until the bulb 5410 deforms a substantial distance toward the stiffener 80 to engage the stiffener 80. As a result, enabling the bulb 5410 to deflect, rotate and/or deflect relative to the stiffener 80 may increase an effectiveness of a seal between the object and the bulb 5410. In some examples, the stiffener 80 may begin to deflect (e.g., about the end 5412) relative to the bulb 5410 and/or the seal flap 5424 prior to engagement by the bulb 5410.

Referring to FIG. 59, the seal flap 5424 of the illustrated example may move independently or substantially independently relative to the bulb 5410 and/or the stiffener 80 along a first deflection path. For example, the object 5702 may engage the seal flap 5424 prior to engaging the bulb 5410. FIG. 59 illustrates example deflected positions of the seal flap 5424 between an initial position 5902, an intermediate deflected position 5904 and another deflected position 5906 (e.g., a fully deflected position). As shown, the seal flap 5424 can deflect relative to the bulb 5410 about the pivot 5434. To this end, enabling the seal flap 5424 to deflect or deform to different positions (e.g., 5902-5906) and/or shapes as shown, for example, in FIG. 59 may improve an effectiveness of a seal between the object and the seal flap 5424 and/or the bulb 5410 and the object. Although not shown, in some examples, the seal flap 5424 may include tabs and/or slits (e.g., the tabs 84 and/or slits 86 of FIG. 15) to provide the seal flap 5424 with greater flexibility and freedom of movement to fit around various vehicle irregularities such as a light 34, a door hardware 36 and/or any other surface irregularities of the object 5702 or the vehicle 18.

FIG. 60 illustrates another example seal assembly 6000 in accordance with the teachings disclosed herein. The example seal assembly 6000 of the illustrated example includes a face panel 6002 having a tip seal 6004 that includes a bulb 6006 and a seal flap 6008. The tip seal 6004 of the illustrated example is formed as a loop such that a looped end 6010 of the face panel 6002 is attached to (e.g., a rear side) the face panel 6002 via, for example, VEL-CRO®. Further, the bulb 6006 has a casing 6012 positioned within a cavity 6014 of the bulb 6006 without a cord or stiffener. The casing 6012 is attached to an inner surface 6016 of the bulb 6006 via, for example, threads, glue and/or any other mechanical or chemical fasteners. Further, the seal flap 6008 of the illustrated example is attached to an outer surface 6018 of the bulb 6006. However, the seal flap 6008 only wraps around a portion of the outer surface 6018 of the bulb 6006. A first end 6020 of the seal flap 6008 is attached to the outer surface 6018 of the bulb 6006 and a second end 6022 of the seal flap 6008 projects away from the outer surface 6018 of the bulb 6006. The second end 6022 pivots relative to the first end 6020 and/or the outer surface of the bulb 6006 via, for example, a pivot 6024 defined by an attachment of the first end 6020 of the seal flap 6008 to the bulb 6006.

Figure 61:
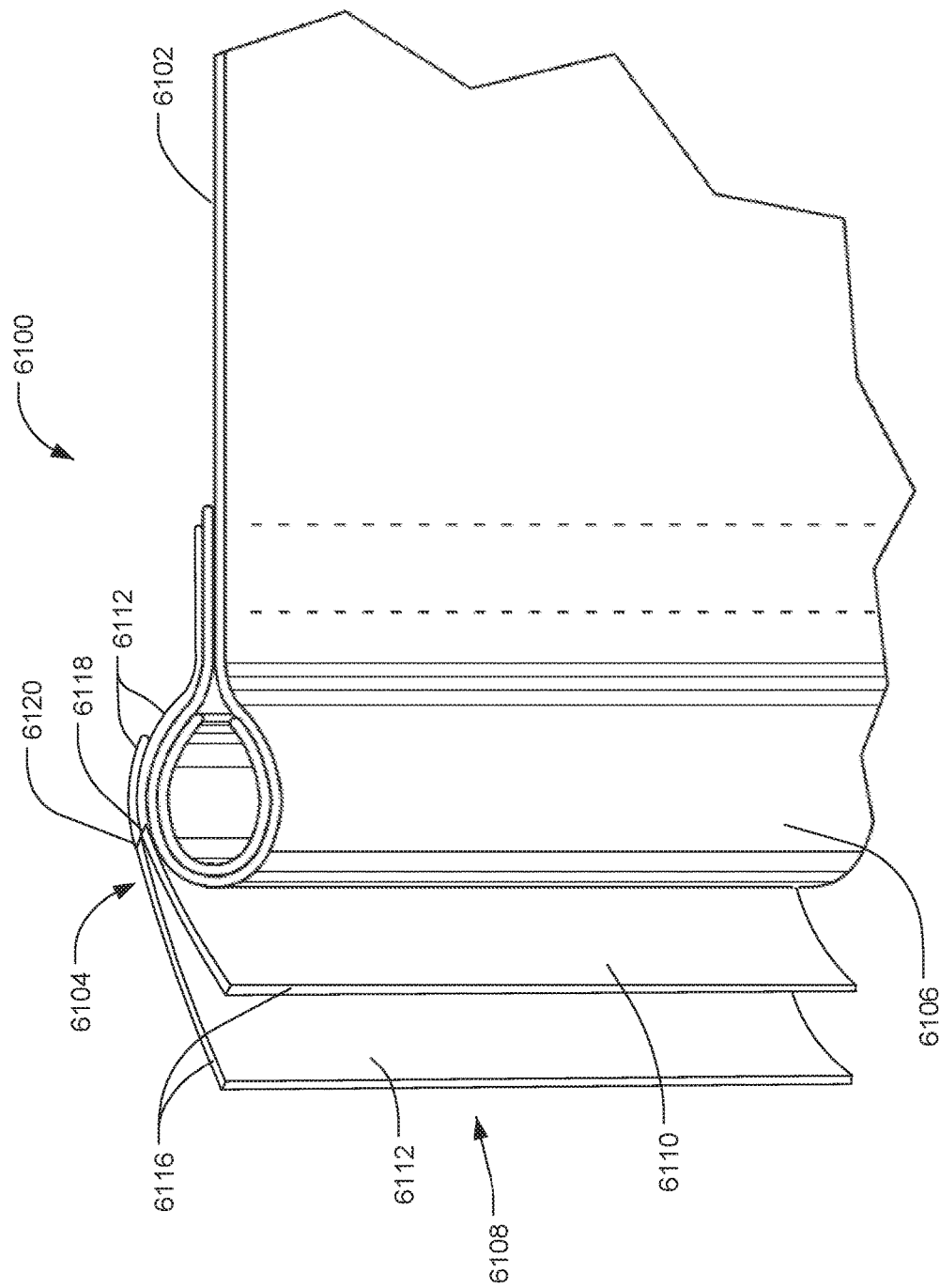
FIG. 61 illustrates another example seal assembly in accordance with teachings disclosed herein.

FIG. 61 illustrates another example seal assembly 6100 in accordance with the teachings disclosed herein. The example seal assembly 6100 of the illustrated example includes a face panel 6102 having a tip seal 6104 that includes a deformable portion or bulb 6106 and a plurality of deflectable portions or seal flaps 6108. In the illustrated example, the seal flaps 6108 include a first deflectable portion or seal flap 6110 and a second deflectable portion or seal flap 6112. For example, a second seal flap 6112 may overlap the first seal flap 6110. Each of the first and second seal flaps 6110 and 6112 include a first portion 6114 coupled or fixed relative to at least one of the bulb 6106 or the face panel 6102 and a second portion 6116 that is to pivot or move relative to at least one of the bulb 6106 or the face panel 6102.

In the illustrate example, the first portion 6114 of the first seal flap 6110 at least partially wraps around the bulb 6106 and/or the face panel 6102 and is attached or coupled to the bulb 6106 and/or the face panel 6102 via, for example, Velcro®, glue, threads, and/or other mechanical and/or chemical fasteners. Additionally, the first portion 6114 of the second seal flap 6112 is wraps around at least a portion of the first seal flap 6110 and/or the bulb 6106. In some examples, the first portion 6114 of the second seal flap 6110 may be attached or coupled to the face panel 6102.

In the illustrated example, a portion or interface between the first and second portions 6114 and 6116 of the first seal flap 6110 is attached or pinned (e.g., via a thread or fastener) to the bulb 6106 to define a pivot 6118 to enable the second portion 6116 of the first seal flap 6110 to pivot, deflect or move relative to the first portion 6114 of the first seal flap 6110, the bulb 6106, the second seal flap 6112 and/or the face panel 6102. Similarly, a portion or interface between the first and second portions 6114 and 6116 of the second seal flap 6112 is attached or pinned to the first seal flap 6110 (e.g., via a thread or fastener) to define a pivot 6120 to enable the second portion 6116 of the second seal flap 6112 to pivot, deflect or move relative to the first portion 6114 of the second seal flap 6112, the bulb 6106, the first seal flap 6110 and/or the face panel 6102. In some examples, the pivot 6120 may be attached to the bulb 6106 and/or the face panel 6102.

As shown in FIG. 61, the pivot 6118 of the first seal flap 6110 overlaps and/or aligns with the pivot 6120 of the second seal flap 6112. In some such examples, the pivot 6118 of the first seal flap 6110 may be separated and/or spaced apart from the pivot 6120 of the second seal flap 6112. In some examples, a web couples the respective second portions 6114 of the first and second seal flaps 6110 and 6112. For example, the web may be configured similar to the example web 109 of FIGS. 29 and 30.

Further, in the example shown in FIG. 61, the second portion 6116 of the second seal flap 6112 projects farther away from the bulb 6106 than the second portion 6116 of the first seal flap 6110 so that the second seal flap 6112 projects into a vehicle path of a loading dock at a distance greater than the first seal flap 6110. As a result, the first seal flap 6110 may engage the vehicle 18 at a first position (e.g., a first side surface of the vehicle 18) and the second seal flap 6112 may engage the object at a second position (e.g., a second side surface of the vehicle 18) different than the first position.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

What is claimed is:

1. A seal assembly for sealing against a vehicle at a loading dock, the loading dock including a wall with a doorway, the seal assembly comprising:
   a foam pad;
   a pliable cover to couple to the foam pad; and
   a shield to attach to the foam pad, the shield having a first end and a second end, the first end to couple to at least one of the foam pad or the pliable cover and the second end to project adjacent a vehicle-engaging surface of the foam pad, the shield to move relative to the foam pad between a standby position when a vehicle is in a non-engaging relationship with the vehicle-engaging surface and a deflected position when the vehicle is in engagement with the vehicle-engaging surface, the pliable cover is to deform in response to engagement of the vehicle with the pliable cover, deformation of the pliable cover is to cause the shield and the pliable cover to move toward an inner surface of the vehicle such that the shield and the pliable cover seal an air gap defined by a door hinge of the vehicle, the shield and the pliable cover to extend inside the vehicle along an inner side wall inside the vehicle when the shield and the pliable cover seal the air gap.

2. The seal assembly of claim 1, further including a backer positioned between the foam pad and the wall adjacent the doorway, the backer to attach the foam pad to the wall.

3. The seal assembly of claim 1, further including a front sheet extending between a first corner of the vehicle-engaging surface of the foam pad and a second corner of the vehicle-engaging surface of the foam pad, the first corner being opposite the second corner.

4. The seal assembly of claim 3, wherein the front sheet is to provide an elongate chamber with a variable volume of air between the front sheet and the pliable cover.

5. The seal assembly of claim 1, wherein the vehicle-engaging surface of the foam pad has a geometric shaped profile.

6. The seal assembly of claim 1, wherein the pliable cover and the vehicle-engaging surface of the foam pad define a cavity therebetween when the pliable cover is coupled to the foam pad.

7. The seal assembly of claim 1, further including a web positioned between an inner surface of the shield and an outer surface of at least one of the foam pad or the pliable cover.

8. The seal assembly of claim 1, further including a stiffener operatively coupled to the shield to urge the shield to the standby position.

9. The seal assembly of claim 1, wherein the second end of the shield includes a L-shaped profile.

10. The seal assembly of claim 1, further including a front sheet coupled to the at least one of the foam pad or the pliable cover, the front sheet to provide an elongate chamber with a variable volume of air between the front sheet and the pliable cover.

11. A seal assembly for sealing against a vehicle at a loading dock, the seal assembly comprising:
   a projection panel to protrude from a wall of the loading dock, the projection panel defining a vehicle-engaging surface to be engaged by a vehicle;
   a pliable cover attached to the projection panel to cover at least a portion of the vehicle-engaging surface; and
   a shield having a first end and a second end, the shield to couple to a side surface of the projection panel such that the first end of the shield is to be oriented toward the wall of the loading dock and the second end is to be oriented in a direction opposite the first end, the second end to project a distance from the vehicle-engaging surface of the projection panel, the second end of the shield to move between a non-deflected position when a vehicle is not in engagement with the vehicle-engaging surface and a deflected position when the vehicle is in engagement with the vehicle-engaging surface, the second end of the shield and the pliable cover are to extend along an inner surface of the vehicle and are to cover an air gap defined by a door hinge of the vehicle.

12. The seal assembly of claim 11, wherein the projection panel includes a backer and a foam core.

13. The seal assembly of claim 12, further including a front sheet to couple to at least one of the pliable cover or the foam core.

14. The seal assembly of claim 13, wherein the front sheet is substantially planar.

15. A seal assembly for sealing against a vehicle at a loading dock, the seal assembly comprising:
   a backer to couple to a wall of a loading dock;
   a foam pad to couple to the backer, the foam pad defining a vehicle-engaging surface to receive a trailer of a vehicle;
   a pliable cover to overlap at least a portion of the vehicle-engaging surface of the foam pad;
   a front sheet to attach to the pliable cover via a first seam adjacent a first side edge of the vehicle-engaging surface and a second seam adjacent a second side edge of the vehicle-engaging surface, the first side edge being opposite the second side edge; and
   a shield having a first portion to attach to at least one of the backer, the foam pad, the pliable cover or the front sheet, the shield having a second portion to project adjacent the vehicle-engaging surface of the foam pad, the second portion of the shield being movable relative to the first portion of the shield between a deflected position and a non-deflected position, the front sheet is to deform in response to the trailer engaging the vehicle-engaging surface of the foam pad, the deformation of the front sheet is to move the shield and the front sheet inside the trailer to cause the front sheet and the shield to seal an air gap at a door hinge of the trailer.

16. The seal assembly of claim 15, wherein the second portion has a hook-shaped end.

17. The seal assembly of claim 15, further including a web to extend between the front sheet and the second portion of the shield, the web to wrap across an air gap at a door hinge of the trailer when the shield is drawn toward an inner surface of the trailer.

18. The seal assembly of claim 15, further including a stiffener coupled to the shield, the stiffener to urge the shield to the non-deflected position when a vehicle is not in engagement with the vehicle-engaging surface.

* * * * *